(12) United States Patent
Kawamura et al.

(10) Patent No.: US 12,036,957 B2
(45) Date of Patent: Jul. 16, 2024

(54) VEHICULAR CLEANER SYSTEM, VEHICLE HAVING VEHICULAR CLEANER SYSTEM, VEHICULAR CLEANER AND VEHICLE HAVING VEHICULAR CLEANER

(71) Applicant: KOITO MANUFACTURING CO., LTD., Tokyo (JP)

(72) Inventors: Kazuki Kawamura, Shizuoka (JP); Masayuki Kondo, Shizuoka (JP); Hikaru Nagai, Shizuoka (JP); Akinobu Kubota, Shizuoka (JP); Yasuhiro Ichikawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/339,415

(22) Filed: Jun. 22, 2023

(65) Prior Publication Data

US 2023/0331191 A1    Oct. 19, 2023

Related U.S. Application Data

(63) Continuation of application No. 16/474,300, filed as application No. PCT/JP2017/044196 on Dec. 8, 2017, now Pat. No. 11,731,590.

(30) Foreign Application Priority Data

Dec. 28, 2016    (JP) .................................. 2016-256292
Dec. 28, 2016    (JP) .................................. 2016-256293

(Continued)

(51) Int. Cl.
*B60S 1/48*    (2006.01)
*B08B 3/02*    (2006.01)

(Continued)

(52) U.S. Cl.
CPC ................ *B60S 1/481* (2013.01); *B08B 3/02* (2013.01); *B60S 1/0848* (2013.01); *B60S 1/52* (2013.01); *B60S 1/54* (2013.01); *F04B 13/02* (2013.01)

(58) Field of Classification Search
CPC .......... B60S 1/481; B60S 1/0848; B60S 1/52; B60S 1/54; B08B 3/02; B08B 3/00; F04B 13/02

(Continued)

(56) References Cited

U.S. PATENT DOCUMENTS 6,917,693 B1    7/2005   Kiridena et al.
10,144,394 B1 *   12/2018  Rice .......................... B60S 1/52

(Continued)

FOREIGN PATENT DOCUMENTS

CN    105537171 A    5/2016
CN    106163888 A    11/2016

(Continued)

OTHER PUBLICATIONS

Communication issued Jan. 24, 2022 by the State Intellectual Property Office of People's Republic of China for Chinese Patent Application No. 201780080959.2.

(Continued)

*Primary Examiner* — Katina N. Henson
(74) *Attorney, Agent, or Firm* — Sughrue Mion, PLLC

(57) ABSTRACT

A vehicular cleaner system (1) for cleaning a to-be-cleaned object (100), wherein: the vehicular cleaner system (1) is provided with a tank (11) that accommodates a cleaning liquid, a pump (12) that pressure-feeds the cleaning liquid inside the tank (11), a high-pressure-air generation unit (2) that generates high-pressure air, a first ejection port that sprays the cleaning liquid toward a cleaning surface of the to-be-cleaned object (100), a second ejection port that sprays (Continued)

the high-pressure air toward the cleaning surface, and a controller (4) and vehicle ECU (40) that control the spraying of the cleaning liquid and the spraying of the high-pressure air; and the controller (4) and the vehicle ECU (40) perform control so as to initiate the spraying of the high-pressure air from the second ejection port after spraying of the cleaning liquid from the first ejection port has been initiated.

5 Claims, 18 Drawing Sheets

(30) Foreign Application Priority Data

Dec. 28, 2016 (JP) .................................. 2016-256294
Dec. 28, 2016 (JP) .................................. 2016-256295

(51) Int. Cl.
  *B60S 1/08* (2006.01)
  *B60S 1/52* (2006.01)
  *B60S 1/54* (2006.01)
  *F04B 13/02* (2006.01)

(58) Field of Classification Search
  USPC ......... 15/313, 250.01; 134/56 R, 105, 104.2, 134/95.3
  See application file for complete search history.

(56) References Cited

U.S. PATENT DOCUMENTS

| | | | |
|---|---|---|---|
| 2003/0029932 A1 | 2/2003 | Nakano et al. | |
| 2011/0073142 A1* | 3/2011 | Hattori | B60S 1/0848 |
| | | | 134/198 |
| 2013/0255023 A1 | 10/2013 | Kikuta et al. | |
| 2015/0078940 A1 | 3/2015 | Kikuta et al. | |
| 2015/0183406 A1* | 7/2015 | Tanaka | B08B 3/02 |
| | | | 134/99.1 |
| 2015/0203077 A1 | 7/2015 | Gokan | |
| 2015/0343999 A1 | 12/2015 | Lopez Galera et al. | |
| 2016/0101735 A1 | 4/2016 | Trebouet | |
| 2016/0339875 A1 | 11/2016 | Ina et al. | |
| 2017/0028968 A1 | 2/2017 | Kubota et al. | |
| 2017/0313286 A1 | 11/2017 | Galera et al. | |
| 2017/0355353 A1 | 12/2017 | Kato et al. | |
| 2019/0152395 A1 | 5/2019 | Trebouet | |
| 2019/0219043 A1 | 7/2019 | Kikuta et al. | |
| 2019/0359180 A1 | 11/2019 | Kubota et al. | |

FOREIGN PATENT DOCUMENTS

| | | |
|---|---|---|
| EP | 2933154 A1 | 10/2015 |
| JP | 2001-171491 A | 6/2001 |
| JP | 2003-54385 A | 2/2003 |
| JP | 2004-182080 A | 7/2004 |
| JP | 2013-6480 A | 1/2013 |
| JP | 2013-230715 A | 11/2013 |
| JP | 2015-83830 A | 4/2015 |
| JP | 2015-202774 A | 11/2015 |
| JP | 2015-214317 A | 12/2015 |
| JP | 2015-224032 A | 12/2015 |
| WO | 2014/010578 A1 | 1/2014 |
| WO | 2016/104050 A1 | 6/2016 |

OTHER PUBLICATIONS

International Search Report issued Feb. 27, 2018 by the International Searching Authority in counterpart International Patent Application No. PCT/JP2017/044196. (PCT/ISA/210).
Written Opinion issued Feb. 27, 2018 by the International Searching Authority in counterpart International Patent Application No. PCT/JP2017/044196. (PCT/ISA/237).
Communication issued Mar. 8, 2022 by the Japanese Patent Office in Japanese Patent Application No. 2018-558981.
Office Action issued May 23, 2023 by the Japan Patent Office in counterpart Japanese Patent Application No. 2022-161247.

* cited by examiner

VEHICULAR CLEANER SYSTEM, VEHICLE HAVING VEHICULAR CLEANER SYSTEM, VEHICULAR CLEANER AND VEHICLE HAVING VEHICULAR CLEANER

CROSS-REFERENCE TO RELATED APPLICATION

This application is a Divisional of U.S. application Ser. No. 16/474,300, filed Jun. 27, 2019, which is a National Stage of International Application No. PCT/JP2017/044196, filed on Dec. 8, 2017, which claims priority to Japanese Patent Application Nos. 2016-256295, 2016-256294, 2016-256293 and 2016-256292, each respectively filed on Dec. 28, 2016, the disclosures of which are incorporated herein in their entirety by reference.

TECHNICAL FIELD

The present invention relates to a vehicular cleaner system configured to clean a to-be-cleaned object and a vehicle having the vehicular cleaner system.

Also, the present invention relates to a vehicular cleaner configured to clean a to-be-cleaned object and a vehicle having the vehicular cleaner.

BACKGROUND ART

In recent years, vehicles having a vehicle-mounted camera configured to capture a situation around a vehicle have been increasing. A lens, which is an imaging surface, of the vehicle-mounted camera may be smudged due to rain, mud and the like. For this reason, in order to remove foreign matters such as water droplets attached on the lens, a device configured to remove the foreign matters by ejecting a cleaning liquid, a compressed air and the like to the lens of the vehicle-mounted camera has been known.

For example, Patent Document 1 discloses a configuration where a compressed air generation unit is provided in the vicinity of the vehicle-mounted camera, and a compressed air of the compressed air generation unit is sprayed from a nozzle to eject a high-pressure air to a front glass of the vehicle-mounted camera, thereby removing water droplets attached on the front glass (refer to Patent Document 1).

CITATION LIST

Patent Document

PATENT DOCUMENT 1: JP-A-2001-171491

SUMMARY OF INVENTION

Technical Problem

In the configuration as disclosed in Patent Document 1, the ejection of the high-pressure air may be insufficient to remove the foreign matters (particularly, mud and the like) attached on the front glass.

An object of the present invention is to provide a vehicular cleaner system capable of effectively removing foreign matters attached on a to-be-cleaned object with a simple configuration, and a vehicle having the vehicular cleaner system.

Also, the configuration as disclosed in Patent Document 1 can simply remove only the foreign matters attached on a single to-be-cleaned object (for example, a front glass of one vehicle-mounted camera).

An object of the present invention is to provide a vehicular cleaner capable of effectively removing foreign matters attached on a plurality of to-be-cleaned objects with a simple configuration, and a vehicle having the vehicular cleaner.

Solution to Problem

In order to achieve the above objects, a vehicular cleaner system of the present invention is a vehicular cleaner system for cleaning a to-be-cleaned object, and includes:
a tank configured to accommodate therein a cleaning liquid;
a pump configured to pressure-feed the cleaning liquid in the tank;
a high-pressure air generation unit configured to generate a high-pressure air;
a first ejection port configured to spray the cleaning liquid toward a cleaning surface of the to-be-cleaned object;
a second ejection port configured to spray the high-pressure air toward the cleaning surface, and
a controller configured to control the spraying of the cleaning liquid and the spraying of the high-pressure air,
wherein the controller is configured to initiate the spraying of the high-pressure air from the second ejection port after the spraying of the cleaning liquid from the first ejection port has been initiated.

According to the above configuration, it is possible to effectively remove foreign matters attached to the to-be-cleaned object with the simple configuration.

Also, in the vehicular cleaner system of the present invention,
the controller may be configured to initiate the spraying of the high-pressure air from the second ejection port after predetermined time elapses from completion of the spraying of the cleaning liquid from the first ejection port.

According to the above configuration, it is possible to prevent a fluid to be sprayed from the first ejection port from being introduced to the second ejection port for the high-pressure air.

Also, in the vehicular cleaner system of the present invention,
the to-be-cleaned object may include at least one of a vehicular lamp and a vehicle-mounted sensor to be mounted on a vehicle, and
the tank and the pump may double as a tank and a pump for a window washer for spraying the cleaning liquid toward a window of the vehicle.

According to the above configuration, the cleaning liquid that is to be used for the window washer can be used to clean the vehicular lamp and the vehicle-mounted sensor, too.

Also, the vehicular cleaner system of the present invention further includes a window washer for spraying the cleaning liquid toward a window of the vehicle,
the window washer has a third ejection port configured to spray the cleaning liquid toward the window, and
the controller may be configured to switchably execute a mode in which the cleaning liquid is to be sprayed from both the first ejection port and the third ejection port and a mode in which the cleaning liquid is to be sprayed from any one of the first ejection port and the third ejection port.

According to the above configuration, the modes are switched depending on situations, so that it is possible to suppress lowering in lifetime of the pump and consumption of the cleaning liquid.

Also, in the vehicular cleaner system of the present invention, the first ejection port and the second ejection port may be configured as one ejection port.

According to the above configuration, the ejection ports of the cleaning liquid and the high-pressure air are commonly used, so that it is possible to miniaturize a nozzle in which the ejection ports are formed.

Also, in the vehicular cleaner system of the present invention, the first ejection port and the second ejection port may be configured as independent separate ejection ports, and the first ejection port may be formed at a position more distant from the cleaning surface than the second ejection port.

According to the above configuration, it is possible to further prevent the fluid to be sprayed from the first ejection port from being introduced to the second ejection port for the high-pressure air.

Also, in order to achieve the above objects, a vehicular cleaner system of the present invention is a vehicular cleaner system for cleaning a to-be-cleaned object, and includes:

a tank configured to accommodate therein a cleaning liquid;

a pump configured to pressure-feed the cleaning liquid in the tank;

a high-pressure air generation unit configured to generate a high-pressure air;

a first ejection port configured to spray the cleaning liquid toward a cleaning surface of the to-be-cleaned object;

a second ejection port configured to spray the high-pressure air toward the cleaning surface, and a controller configured to control the spraying of the cleaning liquid and the spraying of the high-pressure air, wherein the controller is configured to switchably execute a first actuation mode in which the cleaning liquid and the high-pressure air are to be sprayed toward the cleaning surface and a second actuation mode in which only the high-pressure air is to be sprayed toward the cleaning surface.

According to the above configuration, it is possible to provide the vehicular cleaner system capable of effectively removing foreign matters attached to the to-be-cleaned object with the simple configuration.

Also, in the vehicular cleaner system of the present invention, the controller may be configured to switch the first actuation mode and the second actuation mode, depending on a type of the to-be-cleaned object.

According to the above configuration, it is possible to perform the cleaning with an appropriate method, depending on the type of the to-be-cleaned object.

Also, in the vehicular cleaner system of the present invention, the to-be-cleaned object may include at least one of a vehicular lamp and a vehicle-mounted sensor to be mounted on a vehicle, and the tank and the pump may double as a tank and a pump for a window washer for spraying the cleaning liquid toward a window of the vehicle.

According to the above configuration, the cleaning liquid that is to be used for the window washer can be used to clean the vehicular lamp and the vehicle-mounted sensor, too.

Also, in the vehicular cleaner system of the present invention, in a state where the window washer is actuated, the controller may determine whether an actuation switch of the vehicular cleaner system is on, and when it is determined that the actuation switch is on, the controller may execute the first actuation mode.

According to the above configuration, it is possible to execute the spraying of the cleaning liquid and the high-pressure air toward the to-be-cleaned object, depending on whether a driver of the vehicle turns on or off the actuation switch.

Also, in the vehicular cleaner system of the present invention, the to-be-cleaned object may include a plurality of vehicle-mounted cameras, and the controller may be configured to execute the first actuation mode for one camera of the plurality of vehicle-mounted cameras and the second actuation mode for the other cameras.

According to the above configuration, the different actuation modes are executed for the vehicle-mounted cameras having different uses, so that it is possible to suppress consumptions of the pump and the cleaning liquid.

Also, in the vehicular cleaner system of the present invention, the first ejection port and the second ejection port may be configured as one ejection port.

According to the above configuration, the ejection ports of the cleaning liquid and the high-pressure air are commonly used, so that it is possible to miniaturize the nozzle in which the ejection ports are formed.

Also, in the vehicular cleaner system of the present invention, the first ejection port and the second ejection port may be configured as independent separate ejection ports, and the first ejection port may be formed at a position more distant from the cleaning surface than the second ejection port.

According to the above configuration, it is possible to prevent the fluid from being mixed when spraying the high-pressure air.

Also, in order to achieve the above objects, a vehicular cleaner system of the present invention is a vehicular cleaner system for cleaning a to-be-cleaned object, and includes:

a tank configured to accommodate therein a cleaning liquid;

a pump configured to pressure-feed the cleaning liquid in the tank;

a high-pressure air generation unit configured to generate a high-pressure air, and a nozzle configured to spray the cleaning liquid and the high-pressure air toward a cleaning surface of the to-be-cleaned object, wherein the nozzle has a first ejection port configured to spray the cleaning liquid toward the cleaning surface and a second ejection port configured to spray the high-pressure air toward the cleaning surface, the first and second ejection ports being independently provided.

According to the above configuration, the high-pressure air and the cleaning liquid are independently sprayed toward the same to-be-cleaned object, so that it is possible to effectively remove the foreign matters attached to the to-be-cleaned object.

Also, in the vehicular cleaner system of the present invention, the first ejection port may be formed at a position more distant from the cleaning surface than the second ejection port.

According to the above configuration, it is possible to prevent the fluid from being mixed upon the spraying the high-pressure air.

Also, in the vehicular cleaner system of the present invention,
the first ejection port and the second ejection port may be arranged in parallel at the same side of the cleaning surface.

According to the above configuration, it is possible to downsize the nozzle.

Also, in the vehicular cleaner system of the present invention,
the second ejection port may be arranged at a position facing a central part of the cleaning surface.

According to the above configuration, the second ejection port for the high-pressure air, which is more susceptible to surrounding environments than the first ejection port for the cleaning liquid, is arranged to face the central part of the cleaning surface, so that it is possible to appropriately spray the high-pressure air toward the cleaning surface.

Also, in the vehicular cleaner system of the present invention,
a step may be formed between the first ejection port and the second ejection port.

According to the above configuration, it is possible to prevent the cleaning liquid to be sprayed from the first ejection port from being introduced into the second ejection port for the high-pressure air.

Also, in the vehicular cleaner system of the present invention,
an ejection angle of the first ejection port may be greater than an ejection angle of the second ejection port.

According to the above configuration, it is possible to widen a spraying area of the cleaning liquid from the first ejection port arranged more distant from the cleaning surface than the second ejection port.

Also, in the vehicular cleaner system of the present invention,
the first ejection port may be arranged to spray the cleaning liquid from a direction different from a spraying direction of the high-pressure air from the second ejection port.

According to the above configuration, the spraying of the high-pressure air and the spraying of the cleaning liquid do not interfere with each other.

Also, in the vehicular cleaner system of the present invention,
the to-be-cleaned object may include at least one of a vehicular lamp and a vehicle-mounted sensor to be mounted on a vehicle,
the second ejection port may be arranged at a position at which the high-pressure air is to be sprayed toward the cleaning surface from one direction in an upper and lower direction of the vehicle, and
the first ejection port may be arranged at a position at which the cleaning liquid is to be sprayed toward the cleaning surface from one direction in a right and left direction of the vehicle.

According to the above configuration, it is possible to appropriately spray the high-pressure air, which is more susceptible to an exterior air environment than the cleaning liquid, toward the cleaning surface.

Also, a vehicle having a vehicular cleaner system of the present invention includes the vehicular cleaner system having any one of the above configurations.

According to the above configuration, it is possible to effectively remove the foreign matters attached to the to-be-cleaned object with the simple configuration.

Also, in order to achieve the above objects, a vehicular cleaner of the present invention is a vehicular cleaner for cleaning a to-be-cleaned object, and includes:
a generation unit configured to generate a high-pressure air, and
a nozzle configured to spray the high-pressure air toward a cleaning surface of the to-be-cleaned object,
wherein the generation unit includes:
a cylinder in which an air is to be introduced,
a piston movably supported to the cylinder and configured to deliver the high-pressure air toward the nozzle,
an urging spring for urging the piston,
a movement mechanism configured to apply a moving force to the piston, thereby moving the piston to a predetermined position, and
a single drive unit configured to drive the movement mechanism, and
wherein a plurality of the pistons configured to be movable by the movement mechanism and a plurality of the cylinders corresponding to the respective pistons are provided for the single drive unit.

According to the above configuration, it is possible to provide the vehicular cleaner capable of effectively removing the foreign matters attached to the plurality of to-be-cleaned objects with the simple configuration.

Also, in the vehicular cleaner of the present invention,
the movement mechanism may include:
a single worm configured to rotate by the single drive unit, and
a plurality of worm wheels configured to be in mesh with the single worm and to rotate in association with rotation of the single worm,
each worm wheel may have a piston having a plurality of gear teeth protruding from an outer peripheral part thereof, and
each piston may be coupled with a rack having rack teeth to be in mesh with the plurality of gear teeth.

According to the above configuration, it is possible to form a generation unit having a plurality of cylinders with the simple configuration.

Also, in the vehicular cleaner of the present invention,
a first cylinder and a second cylinder may be provided for the single drive unit, and
the first cylinder may be arranged at a symmetrical position to the second cylinder about a drive shaft of the drive unit.

According to the above configuration, it is possible to thin the generation unit and to cancel vibrations to be generated from the respective cylinders.

Also, in the vehicular cleaner of the present invention,
the drive unit may be interposed between the first cylinder and the second cylinder.

According to the above configuration, it is possible to further downsize the generation unit.

Also, in the vehicular cleaner of the present invention,
the first cylinder and the second cylinder may have an ejection port for delivering the high-pressure air toward the nozzle, respectively, and
the ejection port of the first cylinder may be formed to face toward an opposite direction to the ejection port of the second cylinder.

According to the above configuration, it is possible to further cancel the vibrations upon the spraying of the high-pressure air.

Also, in the vehicular cleaner of the present invention,
a first cylinder and a second cylinder may be provided for the single drive unit, and
a phase of the piston of the first cylinder and a phase of the piston of the second cylinder may be different from each other.

According to the above configuration, it is possible to spray the high-pressure air toward the plurality of to-be-cleaned objects at different timings.

Also, in the vehicular cleaner of the present invention,
a first cylinder and a second cylinder may be provided for the single drive unit,
the movement mechanism may include:
a single worm configured to rotate by the single drive unit, and
a single worm wheel configured to be in mesh with the single worm and to rotate in association with rotation of the single worm,
the worm wheel may have a piston having a plurality of gear teeth protruding from an outer peripheral part thereof,
the piston of the first cylinder and the piston of the second cylinder may be respectively coupled with a rack having rack teeth configured to be in mesh with the plurality of gear teeth, and
the first cylinder may be arranged in the vicinity of the second cylinder.

According to the above configuration, it is possible to downsize the generation unit in a width direction.

Also, in the vehicular cleaner of the present invention,
the cylinder may have a second engaging part formed on an outer surface facing a first engaging part formed at a housing of the generation unit, and
the first engaging part and the second engaging part may be engaged with each other, so that the cylinder may be mounted to the housing.

According to the above configuration, it is possible to easily attach the cylinder to the housing of the generation unit.

Also, a vehicle having a vehicular cleaner of the present invention includes the vehicular cleaner having any one of the above configurations.

Also, according to the above configuration, it is possible to effectively remove the foreign matters attached to the plurality of to-be-cleaned objects with the simple configuration.

Advantageous Effects of Invention

According to the vehicular cleaner system of the present invention, it is possible to effectively remove the foreign matters attached to the to-be-cleaned object with the simple configuration. Also, according to the vehicle having a vehicular cleaner system of the present invention, it is possible to effectively remove the foreign matters attached to the to-be-cleaned object with the simple configuration.

Also, according to the vehicular cleaner of the present invention, it is possible to effectively remove the foreign matters attached to the plurality of to-be-cleaned objects with the simple configuration. Also, according to the vehicle having a vehicular cleaner of the present invention, it is possible to effectively remove the foreign matters attached to the plurality of to-be-cleaned objects with the simple configuration.

DESCRIPTION OF EMBODIMENTS

Hereinafter, an example of an exemplary embodiment with be described with reference to the drawings.

A vehicular cleaner system of the present invention is applied as a system configured to remove foreign matters such as water droplets, mud, grit and dust and the like attached to a vehicular lamp mounted to a vehicle, a vehicle-mounted sensor, a window of the vehicle or the like (examples of the to-be-cleaned object) by using a cleaning liquid and a high-pressure air.

Figure 1:
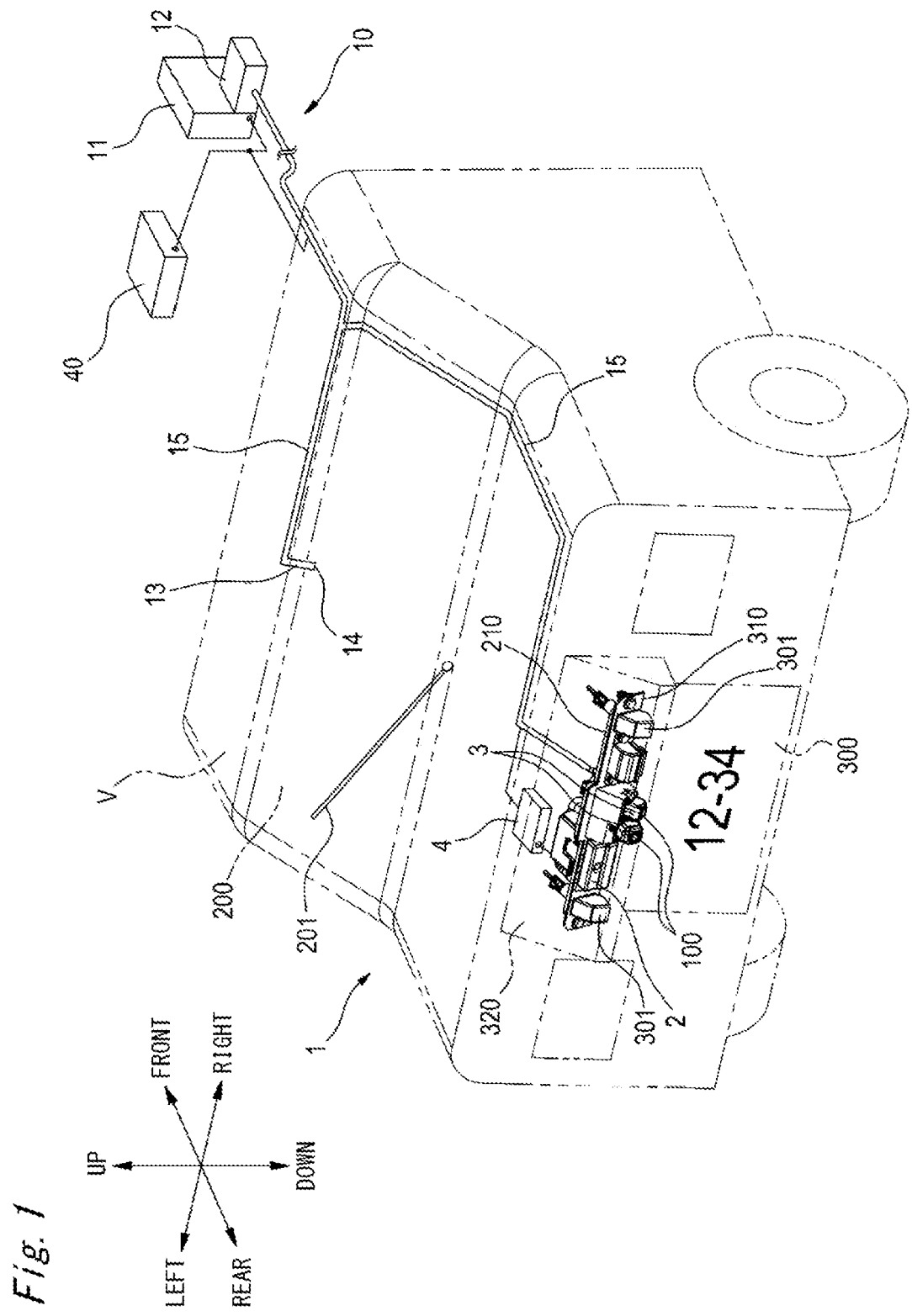
FIG. 1 is a perspective view of a rear part of a vehicle having a vehicular cleaner system in accordance with an exemplary embodiment of the present invention.

As shown in FIG. 1, a vehicular cleaner system 1 can be used to wash the foreign matters attached to a vehicle-mounted camera 100 (an example of the vehicle-mounted sensor) mounted at a rear part of a vehicle V and a rear window 200 of the vehicle V, for example.

The vehicular cleaner system 1 includes a window washer device 10 for spraying a cleaning liquid toward the rear window 200 of the vehicle V. The window washer device 10 includes a tank 11 configured to accommodate therein the cleaning liquid, and a motor pump 12 (an example of the pump) configured to pressure-feed the cleaning liquid accommodated in the tank 11, and a nozzle 13 configured to spray the cleaning liquid toward the rear window 200. The nozzle 13 is formed with an ejection port 14 (an example of the third ejection port) opening toward the rear window 200. The tank 11 and the motor pump 12 are arranged in a bonnet of the vehicle V, for example. The nozzle 13 is coupled to the motor pump 12 through a coupling hose 15. In the meantime, the tank 11 and the motor pump 12 may be arranged at a rear side of the vehicle V. The window washer device 10 can function as a device configured to clean a front window of the vehicle V, too.

The window washer device 10 is controlled by a vehicle ECU (Electronic Controller) 40. For example, when a rear washer button (not shown) for cleaning the rear window 200 is operated by a driver, the vehicle ECU 40 controls so that the cleaning liquid in the tank 11 is to be sprayed from the ejection port 14 toward the rear window 200. Also, after the cleaning liquid is sprayed, the vehicle ECU 40 controls a rear wiper 201 so as to operate by a predetermined number of times.

Also, the vehicular cleaner system 1 includes a high-pressure air generation unit 2 configured to generate a high-pressure air, a nozzle 3 configured to spray the cleaning liquid and the high-pressure air toward the vehicle-mounted camera 100, and a controller 4 configured to control the spraying of the nozzle 3.

The high-pressure air generation unit 2 is mounted to a mounting member 310 to which a license plate lamp 301 configured to irradiate light to a license plate 300 is mounted, for example. The nozzle 3 is formed integrally with a housing of the vehicle-mounted camera 100, and is mounted to the mounting member 310 together with the vehicle-mounted camera 100. The mounting member 310 is mounted to an outer panel 210 of the rear part of the vehicle, for example. The mounting member 310 mounted to the outer panel 210 is covered from an upper side by a garnish 320. The controller 4 is arranged in the outer panel 210, for example, and is connected to the vehicle ECU 40 configured to control the window washer device 10. Also, the controller 4 is connected to the high-pressure air generation unit 2. In the meantime, a configuration where the processing of the controller 4 is executed by the vehicle ECU 40 and the controller is thus integrated is also possible.

Figure 2:
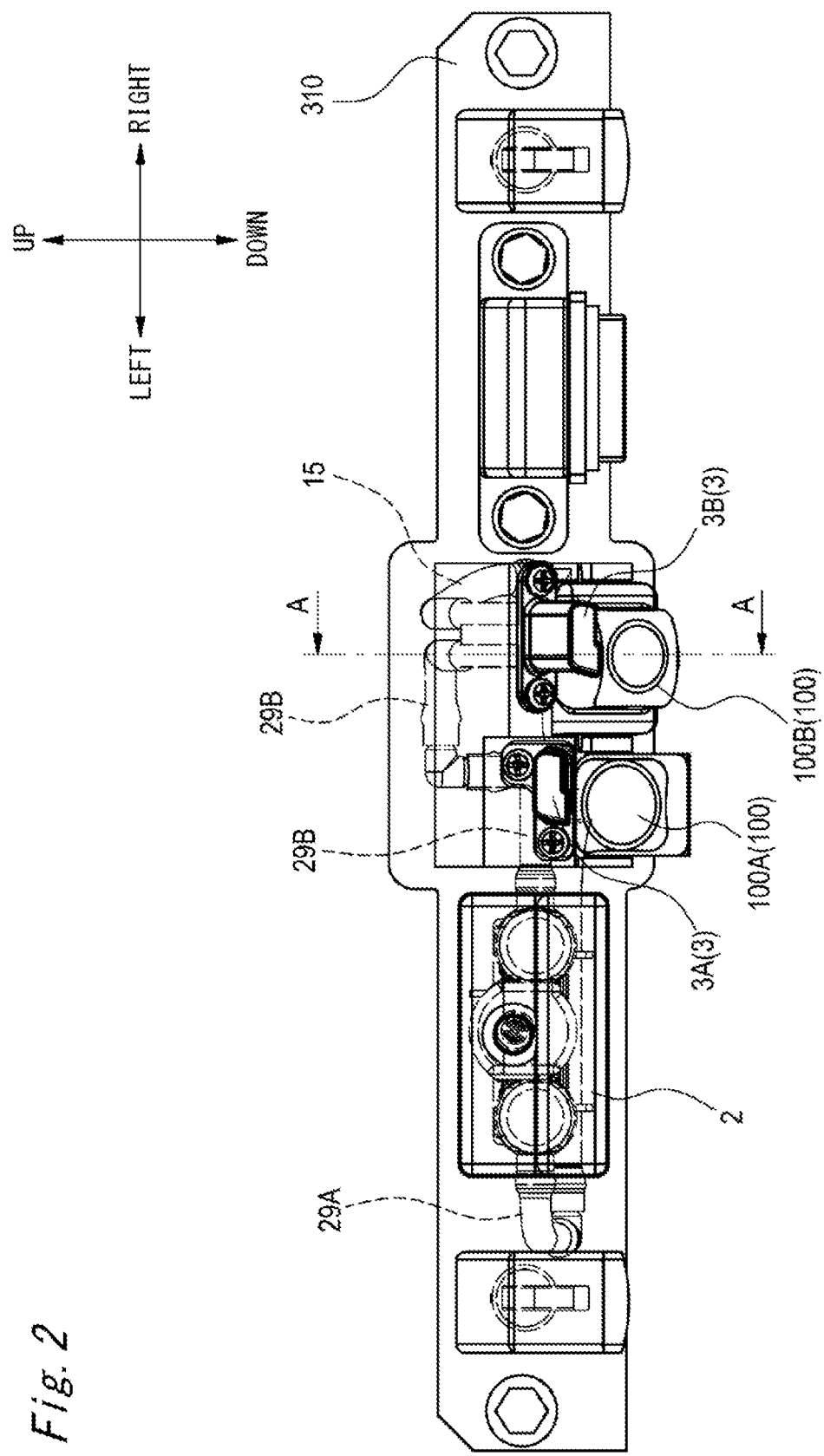
FIG. 2 is a front view depicting a high-pressure air generation unit, a nozzle and the like of the vehicular cleaner system.
Figure 3:
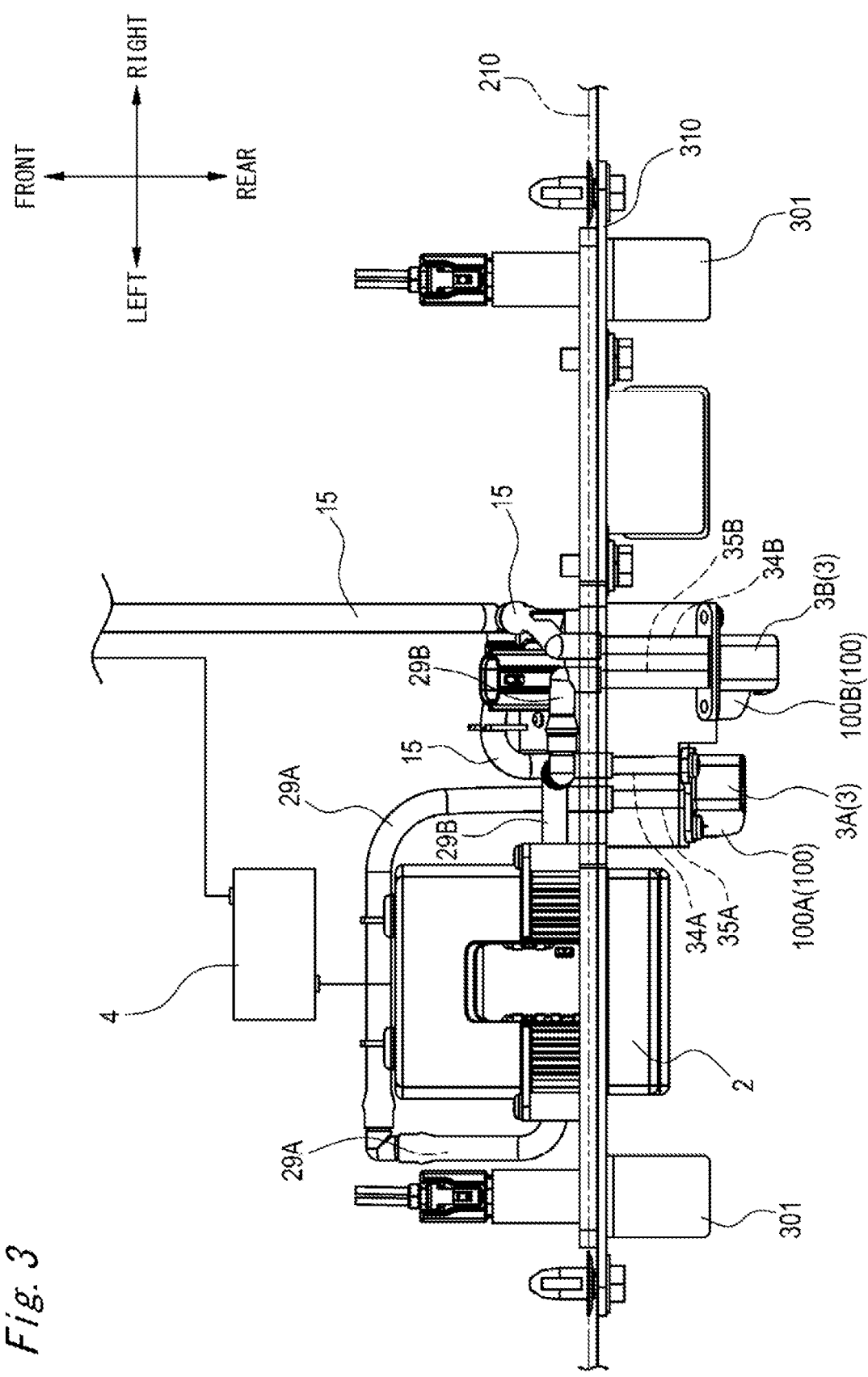
FIG. 3 is a plan view of the vehicular cleaner system shown in FIG. 2.

As shown in FIGS. 2 and 3, the vehicle-mounted camera 100 mounted to the mounting member 310 includes, for example, an inner mirror camera 100A and a rearview camera 100B. The inner mirror camera 100A is a camera for capturing a rear situation (image) that can be checked by an inner mirror (rearview minor), and is configured to operate while at least an engine of the vehicle V is on. The rearview camera 100B is a camera for capturing an image in the vicinity of the rear of the vehicle V, and operates when a gear of the vehicle V is switched to a reverse state, for example. The images captured by the inner mirror camera 100A and the rearview camera 100B are displayed on a monitor (not shown) provided in a vehicle interior, for example.

A nozzle 3A mounted to the inner mirror camera 100A is coupled to the motor pump 12 of the window washer device 10 through the coupling hose 15 and is coupled to the high-pressure air generation unit 2 through a coupling hose 29A. A nozzle 3B mounted to the rearview camera 100B is coupled to the motor pump 12 of the window washer device 10 through the coupling hose 15 and is coupled to the high-pressure air generation unit 2 through a coupling hose 29B. The tank 11 and the motor pump 12 for the window washer device 10 are used as a tank and a motor pump for spraying the cleaning liquid for cleaning the inner minor camera 100A and the rearview camera 100B, too.

Figure 4:
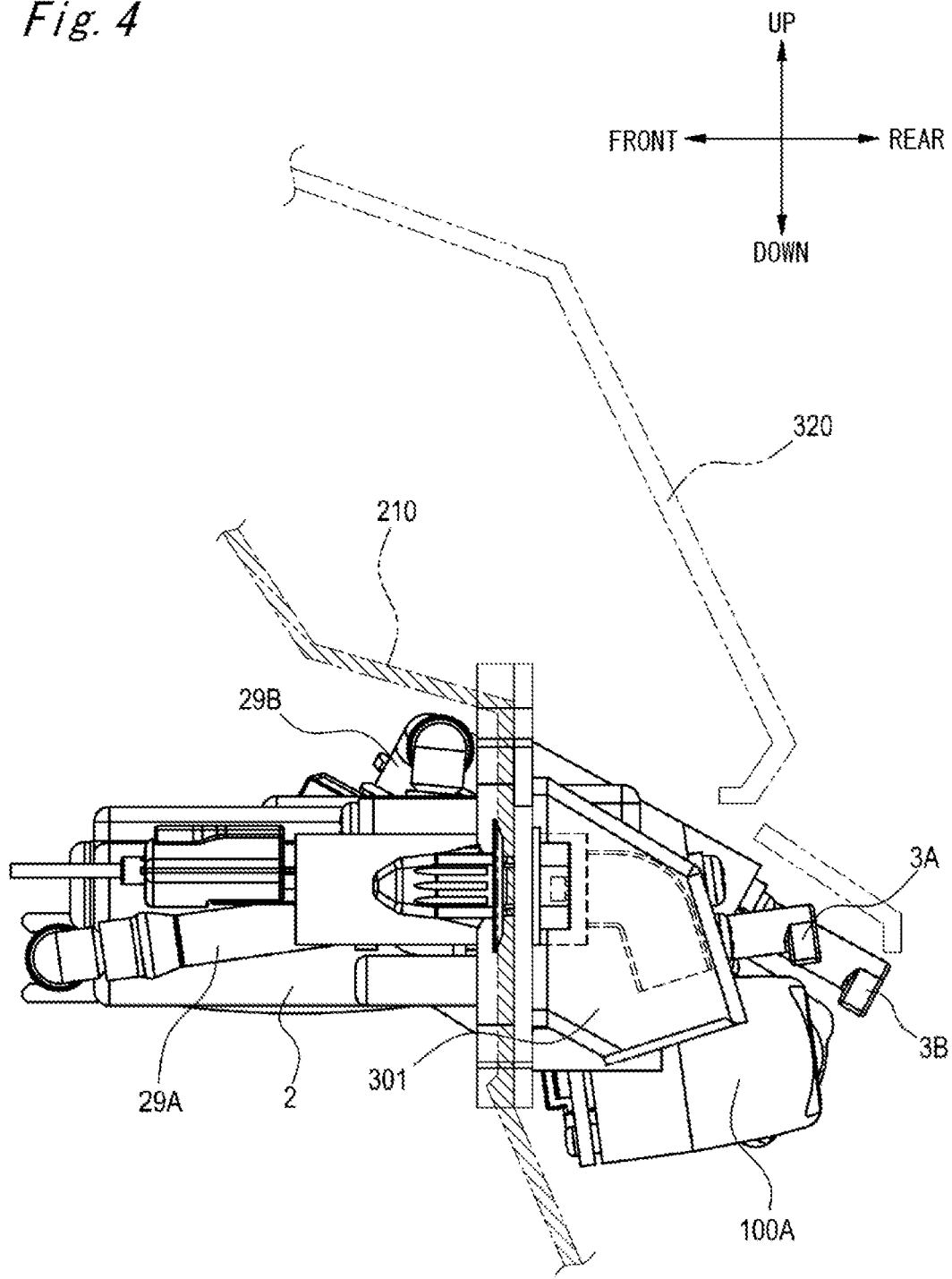
FIG. 4 is a left side view of FIG. 2.
Figure 5:
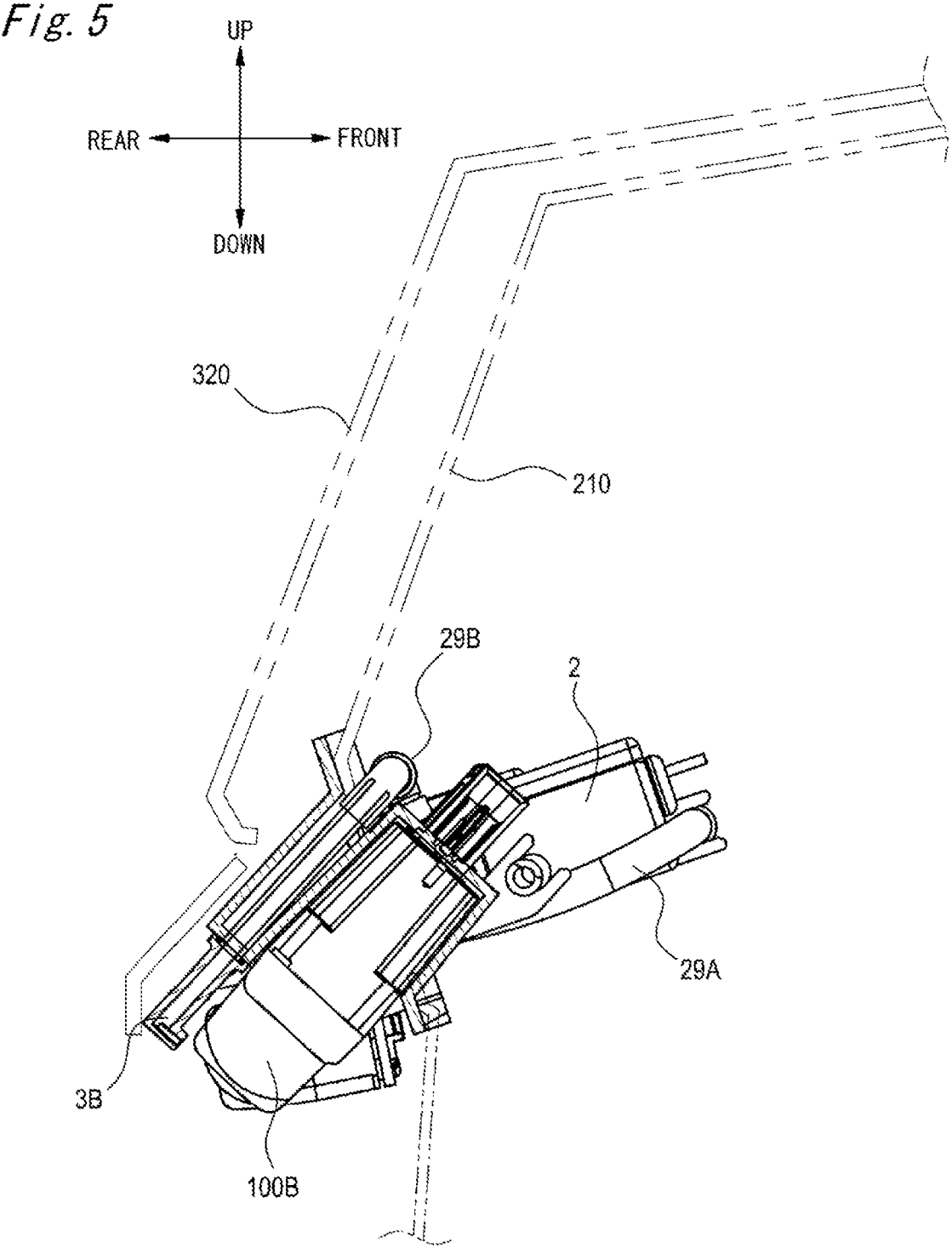
FIG. 5 is a sectional view taken along a line A-A of FIG. 2.

As shown in FIG. 4, the inner mirror camera 100A is mounted to face toward the substantial right rear of the vehicle V. Also, as shown in FIG. 5, the rearview camera 100B is mounted to the rear of the vehicle V in an obliquely downward direction.

Figure 6:
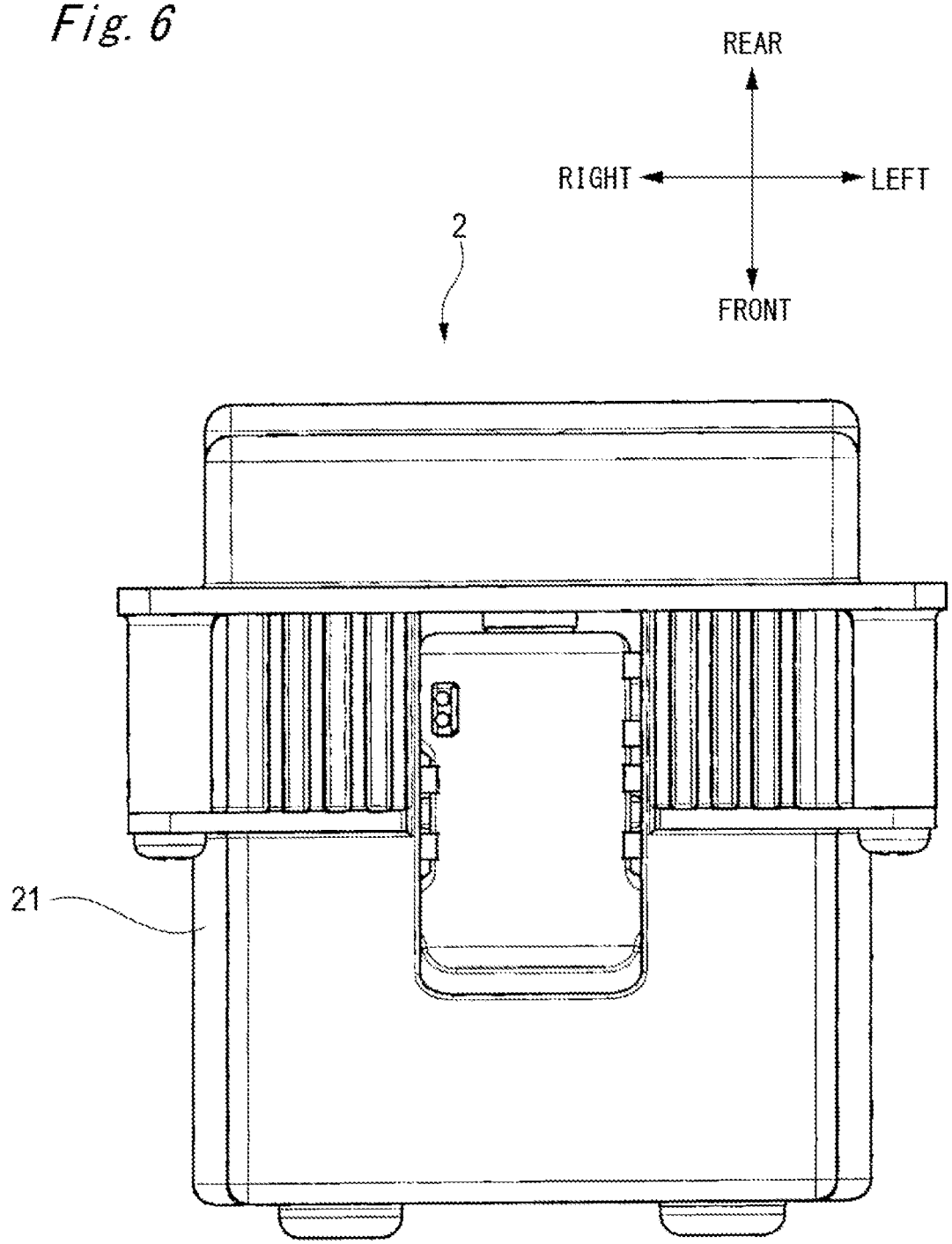
FIG. 6 is a plan view of the high-pressure air generation unit.
Figure 7:
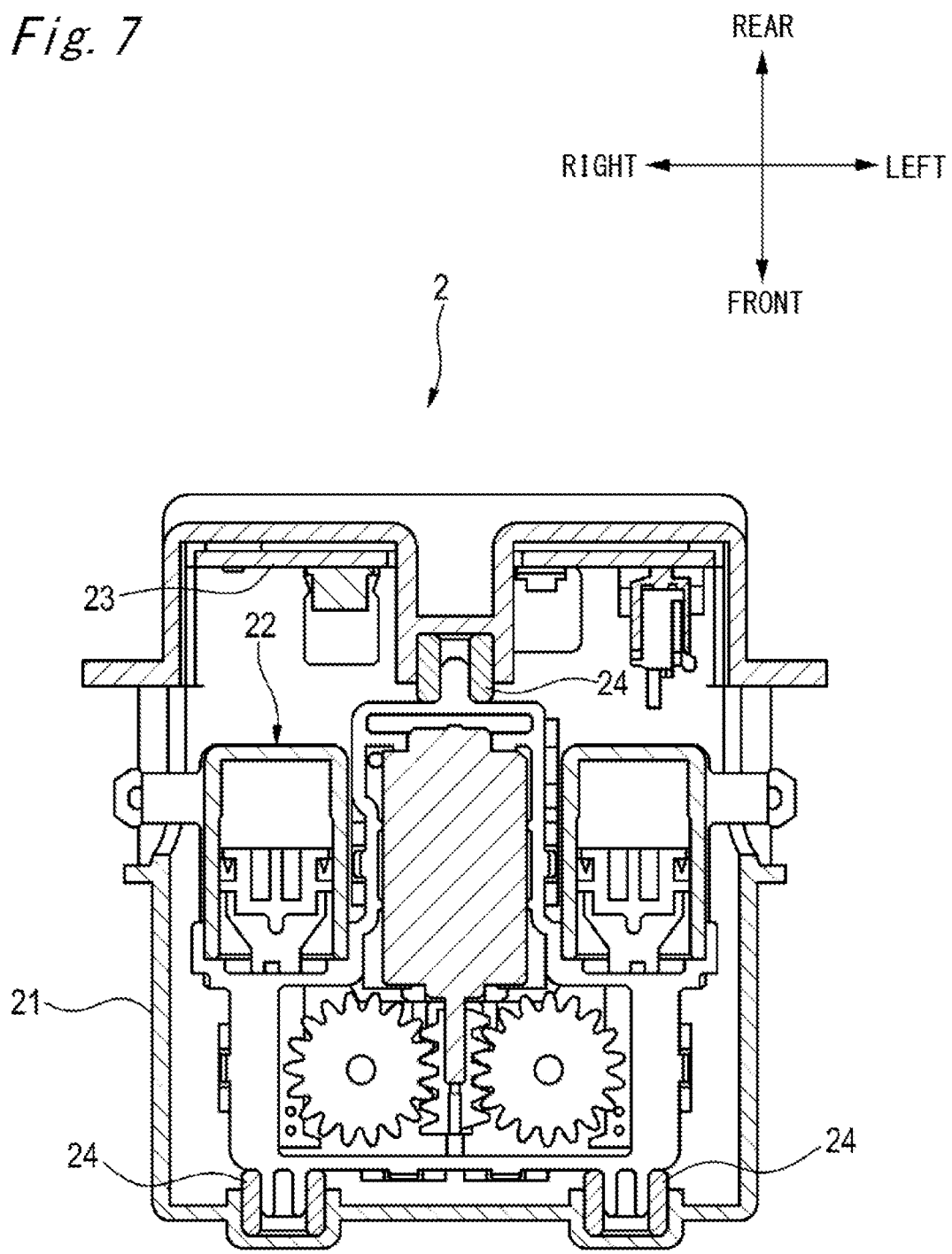
FIG. 7 is a sectional view depicting an inside of the high-pressure air generation unit shown in FIG. 6.

As shown in FIGS. 6 and 7, the high-pressure air generation unit 2 includes a housing 21, a generation main body part 22 accommodated in the housing 21, and a control unit (control substrate) 23 configured to control operations of the generation main body part 22. The generation main body part 22 is mounted to the housing 21 via a damper 24.

Figure 8:
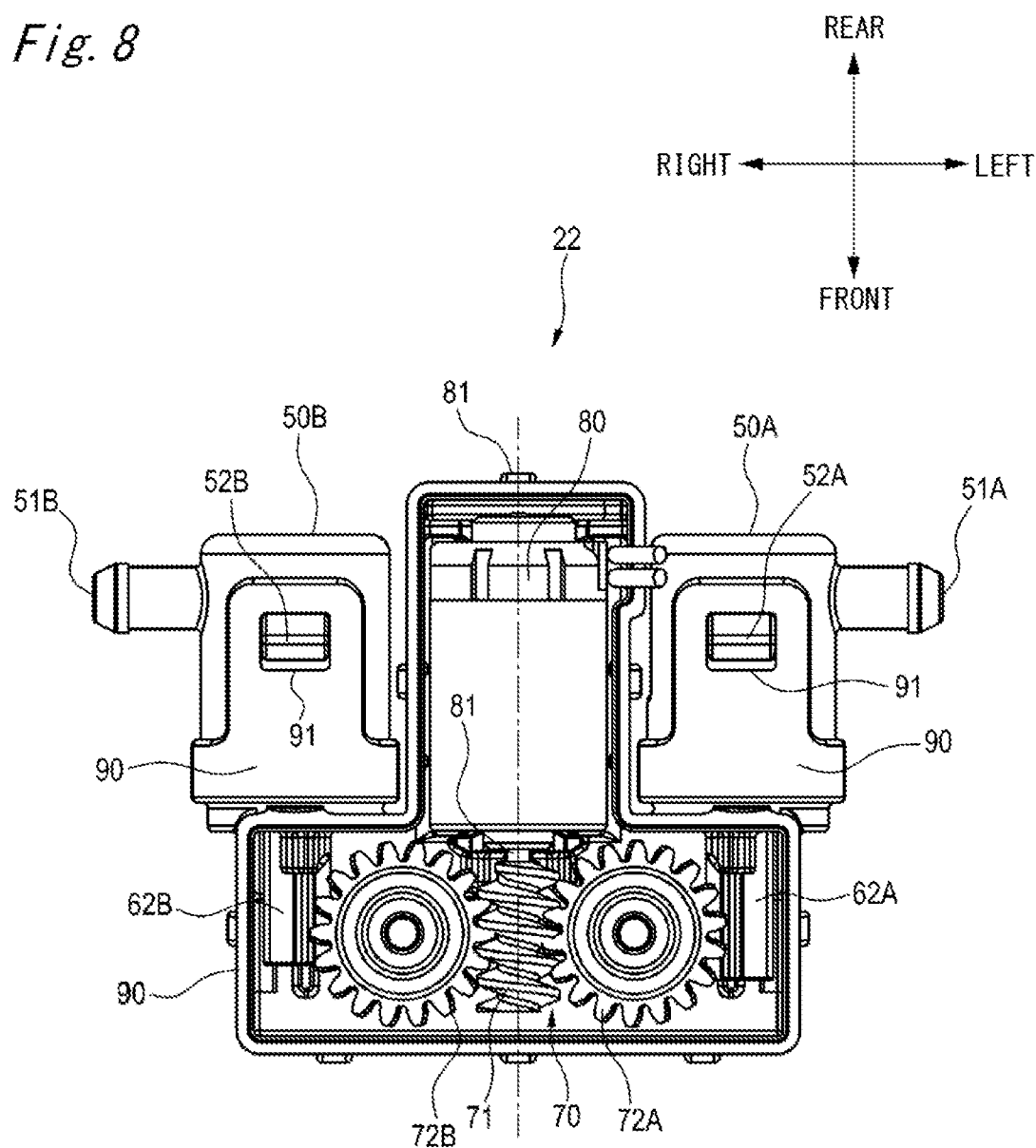
FIG. 8 is a plan view depicting a generation main body part of the high-pressure air generation unit.
Figure 9:
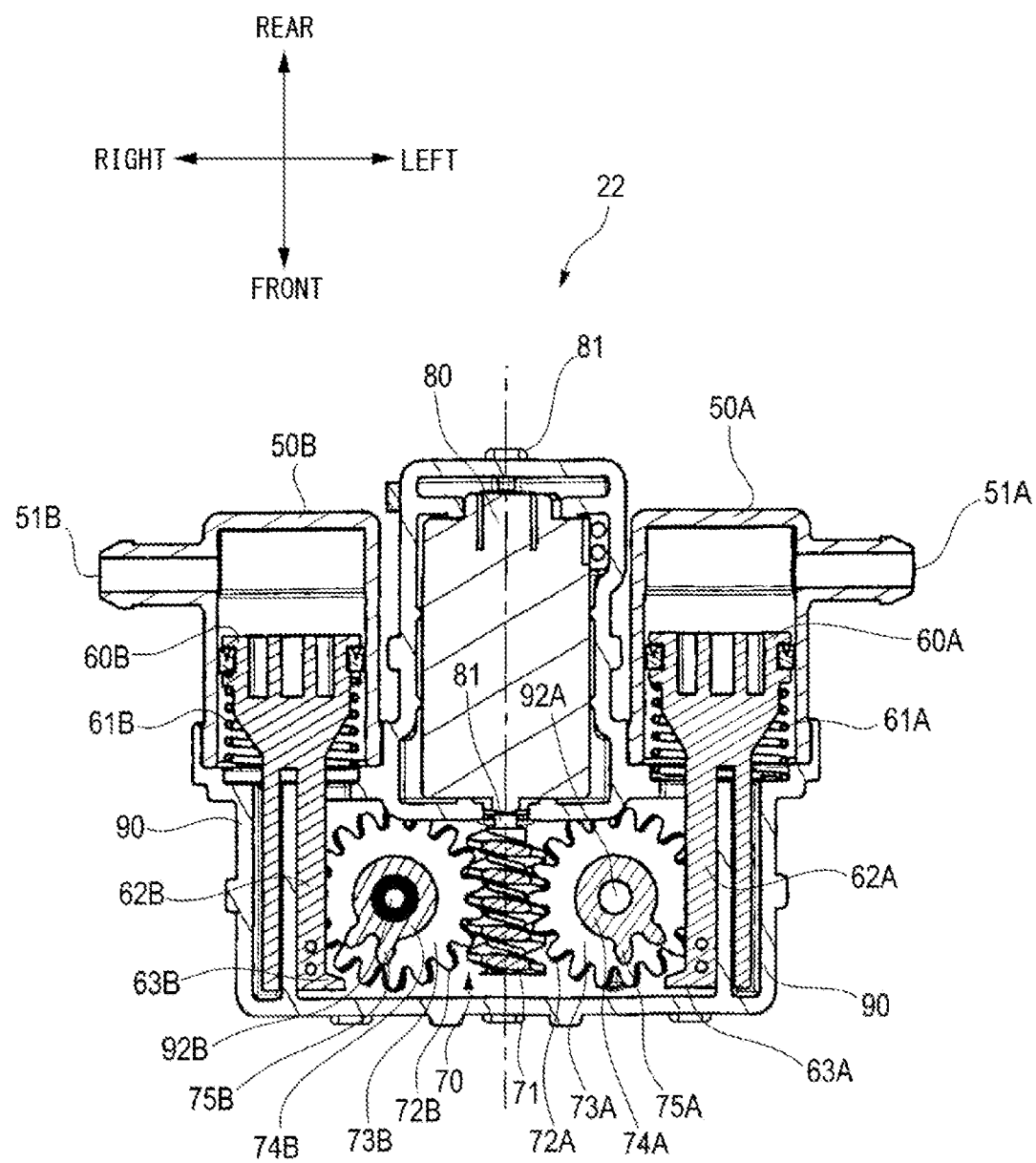
FIG. 9 is a sectional view of the generation main body part shown in FIG. 8.

As shown in FIGS. 8 and 9, the generation main body part 22 includes a plurality of (two, in the example) cylinders 50A, 50B, and pistons 60A, 60B movably supported in the respective cylinders. Also, the generation main body part 22 includes a movement mechanism 70 configured to apply a moving force to the pistons 60A, 60B to move the same to predetermined positions, and a single drive unit 80 configured to drive the movement mechanism 70.

The cylinder 50A and the cylinder 50B are arranged at bilaterally symmetrical positions about a drive shaft 81 of the drive unit 80. Also, in the example, the drive unit 80 is interposed between the cylinder 50A and the cylinder 50B.

The cylinder 50A has an ejection port 51A for delivering the high-pressure air toward the nozzle 3A for the inner mirror camera 100A. The cylinder 50B has an ejection port 51B for delivering the high-pressure air toward the nozzle 3B for the rearview camera 100B. The ejection port 51A of the cylinder 50A is formed to face toward an opposite direction to the ejection port 51B of the cylinder 50B (in the example, the ejection port 51A faces leftward and the ejection port 51B faces rightward). The ejection port 51A is coupled with the coupling hose 29A communicating with the nozzle 3A. The ejection port 51B is coupled with the coupling hose 29B communicating with the nozzle 3B.

The cylinders 50A, 50B of the generation main body part 22 are detachably configured. The housing 90 of the generation main body part 22 is formed with concave parts 91 (an example of the first engaging part). Outer surfaces of the cylinders 50A, 50B are formed with convex parts 52A, 52B (an example of the second engaging part) protruding upward. The convex parts 52A, 52B of the cylinders 50A, 50B are engaged with the concave parts 91 of the housing 90, so that the cylinders 50A, 50B are mounted to the housing 90.

The pistons 60A, 60B are supported to the cylinders 50A, 50B so as to be reciprocally movable in the front and rear direction. Urging springs 61A, 61B are supported to front parts of the pistons 60A, 60B, in the cylinders 50A, 50B. The urging springs 61A, 61B are, for example, compression coils, and are provided to urge rearward the pistons 60A, 60B. When the pistons 60A, 60B are moved rearward by the urging of the urging springs 61A, 61B, the high-pressure air compressed in the cylinders 50A, 50B are delivered from the ejection ports 51A, 51B. On the other hand, when the pistons 60A, 60B are moved forward against the urging of the urging springs 61A, 61B, the air (exterior air) is introduced into the cylinders 50A, 50B through air introduction grooves (not shown).

Front end portions of the pistons 60A, 60B are coupled with racks 62A, 62B extending in the front and rear direction. The racks 62A, 62B extend with protruding outward from the cylinders 50A, 50B, and are configured to reciprocally move in the front and rear direction together with the pistons 60A, 60B. The racks 62A, 62B are provided with rack teeth 63A, 63B. The rack tooth 63A of the rack 62A protrudes toward the rack 62B (toward the rightward direction), and the rack tooth 63B of the rack 62B protrudes toward the rack 62A (toward the leftward direction).

The movement mechanism 70 includes a single worm 71 configured to rotate by the drive unit 80 and a plurality of (in the example, two) worm wheels 72A, 72B configured to be in mesh with the worm 71 and to rotate in association with rotation of the worm 71.

The worm 71 is fixed to the drive shaft 81 extending forward from the drive unit 80 and is configured to rotate in association with rotation of the drive shaft 81.

The worm wheels 72A, 72B are supported at central parts thereof to support shaft parts 92A, 92B of the housing 90 via bearings. The worm wheel 72A and the worm wheel 72B are arranged at bilaterally symmetrical positions about the worm 71.

The respective worm wheels 72A, 72B are configured by driven gears (helical gears) 73A, 73B and pinions 74A, 74B protruding laterally from central parts of the driven gears 73A, 73B. The driven gears 73A, 73B are in mesh with the worm 71, and are configured to rotate in association with rotation of the worm 71. The pinions 74A, 74B are arranged coaxially with the driven gears 73A, 73B, and are configured to rotate together with the driven gears 73A, 73B. The driven gear 73A and the pinion 74A are configured to rotate in a clockwise direction and the driven gear 73B and the pinion 74B are configured to rotate in a counterclockwise direction, in FIGS. 8 and 9.

Outer peripheral parts of the pinions 74A, 74B are respectively formed with a plurality of (in the example, two) gear teeth 75A, 75B protruding radially. The gear teeth 75A of the pinion 74A can mesh with the rack tooth 63A of the rack 62A, and the gear teeth 75B of the pinion 74B can mesh with the rack tooth 63B of the rack 62B. In the meantime, positions at which the gear teeth 75A of the pinion 74A are formed in an outer periphery direction of the pinion 74A and positions at which the gear teeth 75B of the pinion 74B are formed in an outer periphery direction of the pinion 74B may be bilaterally symmetrical or may be asymmetrical about the worm 71. For example, in the asymmetrical case, a phase of the piston 60A and a phase of the piston 60B configured to reciprocally move in the front and rear direction are different.

In the generation main body part 22 configured as described above, when the drive unit 80 is driven under predetermined conditions, the worm 71 is rotated, so that the driven gears 73A, 73B of the worm wheels 72A, 72B in mesh with the worm 71 are respectively rotated in opposite circumferences. When the driven gears 73A, 73B are rotated, the pinions 74A, 74B formed integrally with the driven gears 73A, 73B are rotated and the gear teeth 75A, 75B of the pinions 74A, 74B are respectively meshed with the rack teeth 63A, 63B of the racks 62A, 62B. When the pinions 74A, 74B are further rotated, the racks 62A, 62B are moved in the opposite direction (forward) to the delivery direction (rearward) of the high-pressure air by the mesh with the gear teeth 75A, 75B, against the urging force of the urging springs 61A, 61B. Thereby, the pistons 60A, 60B coupled to the racks 62A, 62B are located forward and the air is introduced into the cylinders 50A, 50B. When the pinions 74A, 74B are further rotated, the meshed state between the rack teeth 63A, 63B and the gear teeth 75A, 75B is released, so that the pistons 60A, 60B are moved in the delivery direction (rearward) by the urging force of the urging springs 61A, 61B. By the movement of the pistons 60A, 60B, the air in the cylinders 50A, 50B is delivered from the respective ejection ports 51A, 51B toward the nozzle 3A, 3B, as the high-pressure air.

Figure 10:
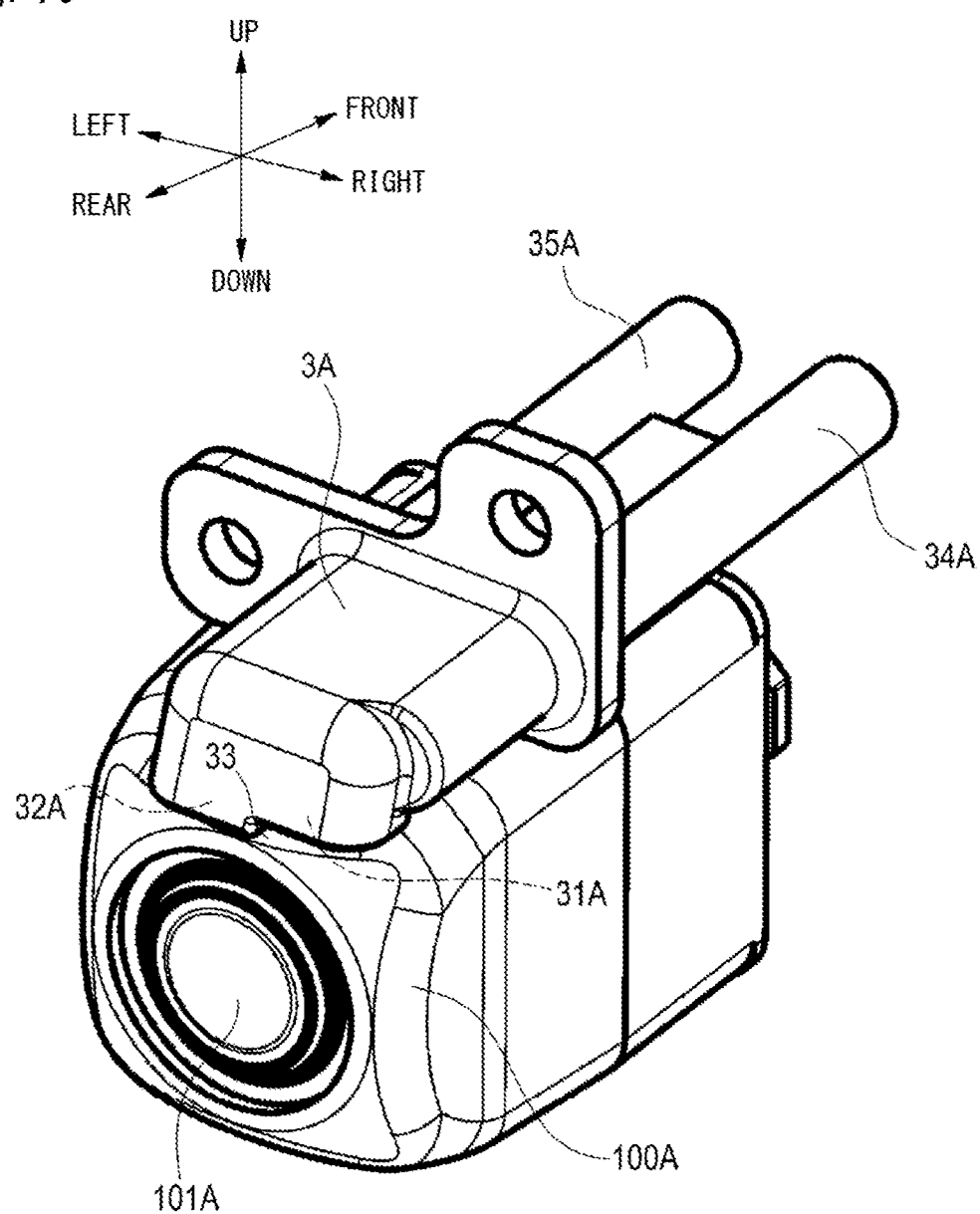
FIG. 10 is an upper perspective view of the nozzle mounted to a vehicle-mounted camera.
Figure 11:
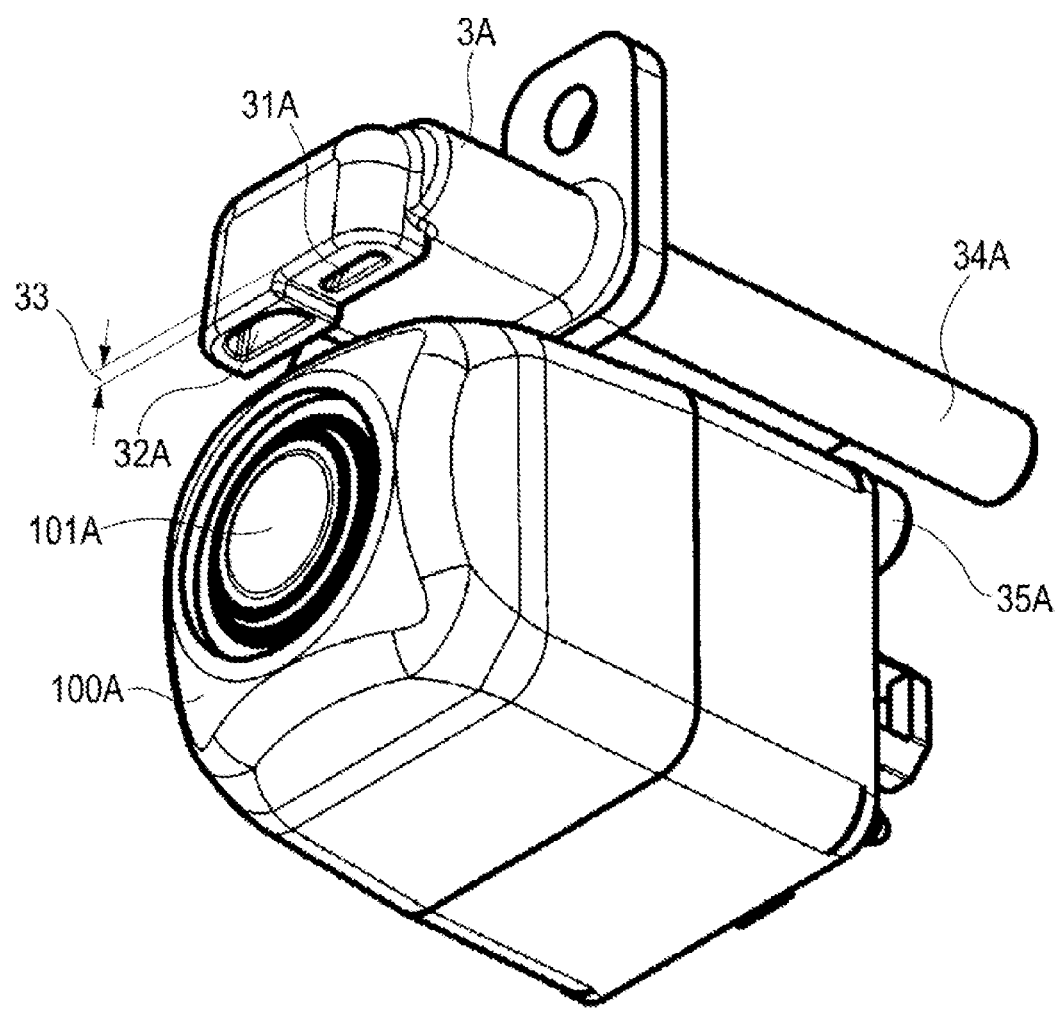
FIG. 11 is a lower perspective view of the nozzle mounted to the vehicle-mounted camera.
Figure 12:
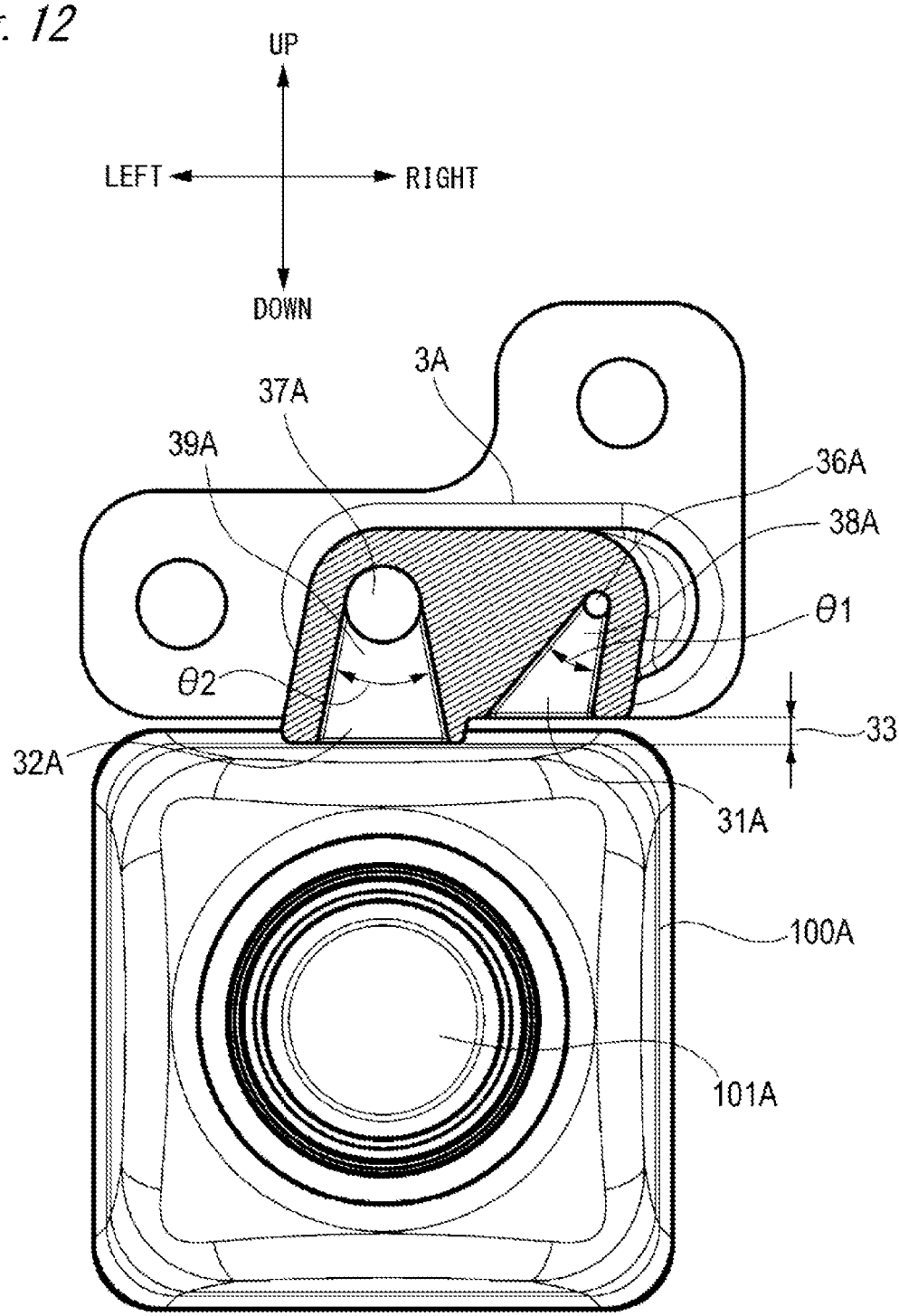
FIG. 12 is a sectional view of the nozzle mounted to the vehicle-mounted camera.

As shown in FIGS. 10 to 12, the nozzle 3A mounted to the inner mirror camera 100A has a cleaning liquid ejection port 31A (an example of the first ejection port) configured to spray the cleaning liquid toward a lens 101A (an example of the cleaning surface) of the inner minor camera 100A and a high-pressure air ejection port 32A (an example of the second ejection port) configured to spray the high-pressure air toward the lens 101A. In the meantime, since the nozzle 3B mounted to the rearview camera 100B has the same configuration as the nozzle 3A, the respective corresponding parts are denoted with the reference numerals "B" replaced with "A", and the nozzle 3B is described focusing on differences from the nozzle 3A.

The cleaning liquid ejection port 31A and the high-pressure air ejection port 32A are formed in the single nozzle 3A, as independent separate ejection ports. The cleaning liquid ejection port 31A and the high-pressure air ejection port 32A are aligned in parallel in the right and left direction on the same side surface (in the example, the upper surface) of the inner mirror camera 100A. The high-pressure air ejection port 32A is arranged at a position facing a central part of the lens 101A. The cleaning liquid ejection port 31A is arranged at a position (in the example, a position deviating rightward) deviating from the central part of the lens 101A. That is, the cleaning liquid ejection port 31A is formed at a position more distant from the lens 101A than the high-pressure air ejection port 32A. Also, a step 33 stepped in the upper and lower direction is formed between the cleaning liquid ejection port 31A and the high-pressure air ejection port 32A.

The cleaning liquid ejection port 31A is configured to communicate with a tube path 34A through which the cleaning liquid is to pass. Also, the high-pressure air ejection port 32A is configured to communicate with a tube path 35A through which the high-pressure air is to pass. The tube paths 34A, 35A are arranged to extend in the front and rear direction above an upper surface of the inner mirror camera 100A.

The tube paths 34A, 35A are formed so that diameters thereof are narrowed at rear ends. A diameter of a rear end port 36A of the tube path 34A is formed smaller than a diameter of a rear end port 37A of the tube path 35A (refer to FIG. 12). The rear end port 36A and the cleaning liquid ejection port 31A are formed to communicate with each other by the ejection path 38A, and the rear end port 37A and the high-pressure air ejection port 32A are formed to communicate with each other by the ejection path 39A. The ejection path 38A and the ejection path 39A are formed so that they are wider toward the ejection ports 31A, 32A, respectively. An ejection angle θ1 of the ejection path 38A is formed greater than an ejection angle θ2 of the ejection path 39A. The ejection path 38A is obliquely formed in a right and lower direction toward a central point of the lens 101A. The ejection path 39A is formed downward toward the central point of the lens 101A.

A front end portion of the tube path 34A is coupled with the coupling hose 15 communicating with the motor pump 12 of the window washer device 10. A front end portion of the tube path 35A is coupled with the coupling hose 29A communicating with the cylinder 50A. In the meantime, a front end portion of a tube path 34B of the nozzle 3B of the rearview camera 100B is coupled with the coupling hose 15 communicating with the motor pump 12 of the window washer device 10, and a front end portion of a tube path 35B is coupled with the coupling hose 29B communicating with the cylinder 50B.

In the example, the cleaning liquid ejection port 31A and the high-pressure air ejection port 32A are aligned in parallel in the right and left direction on the upper surface of the inner minor camera 100A. However, the present invention is not limited thereto. For example, the cleaning liquid ejection port 31A and the high-pressure air ejection port 32A may be respectively arranged on different side surfaces of the inner mirror camera 100A. In this case, preferably, the high-pressure air ejection port 32A is arranged at a position at which the high-pressure air is to be sprayed toward the lens 101A from one direction in the upper and lower direction, and the cleaning liquid ejection port 31A is arranged at a position at which the cleaning liquid is to be sprayed toward the lens 101A from one direction in the right and left direction. In the meantime, for example, when the vehicle-mounted camera is mounted to the front part of the vehicle, the high-pressure air ejection port is preferably arranged below the lens, considering a wind pressure from the front.

The controller 4 and the vehicle ECU 40 can switchably execute an actuation mode in which the cleaning liquid and the high-pressure air are to be sprayed toward the cleaning surface for cleaning and an actuation mode in which only the high-pressure air is to be sprayed toward the cleaning surface for cleaning, for example. In this case, the controller 4 and the vehicle ECU 40 can switchably execute the two actuation modes, depending on a type of the to-be-cleaned object, for example. Also, in the case of the actuation mode in which the cleaning liquid and the high-pressure air are to be sprayed toward the cleaning surface for cleaning, the controller 4 and the vehicle ECU 40 can initiate the spraying of the high-pressure air from the high-pressure air ejection port 32A of the nozzle 3A after the spraying of the cleaning liquid from the cleaning liquid ejection port 31A of the nozzle 3A has been initiated, for example, Also, the controller 4 and the vehicle ECU 40 can switchably execute an actuation mode in which the cleaning liquid is to be sprayed from both the cleaning liquid ejection port 31A of the nozzle 3A and the ejection port 14 of the nozzle 13 and an actuation mode in which the cleaning liquid is to be sprayed from only one of the cleaning liquid ejection port 31A of the nozzle 3A and the ejection port 14 of the nozzle 13.

Subsequently, operations of the vehicular cleaner system 1 are described with reference to FIGS. 13 to 15.

Figure 13:
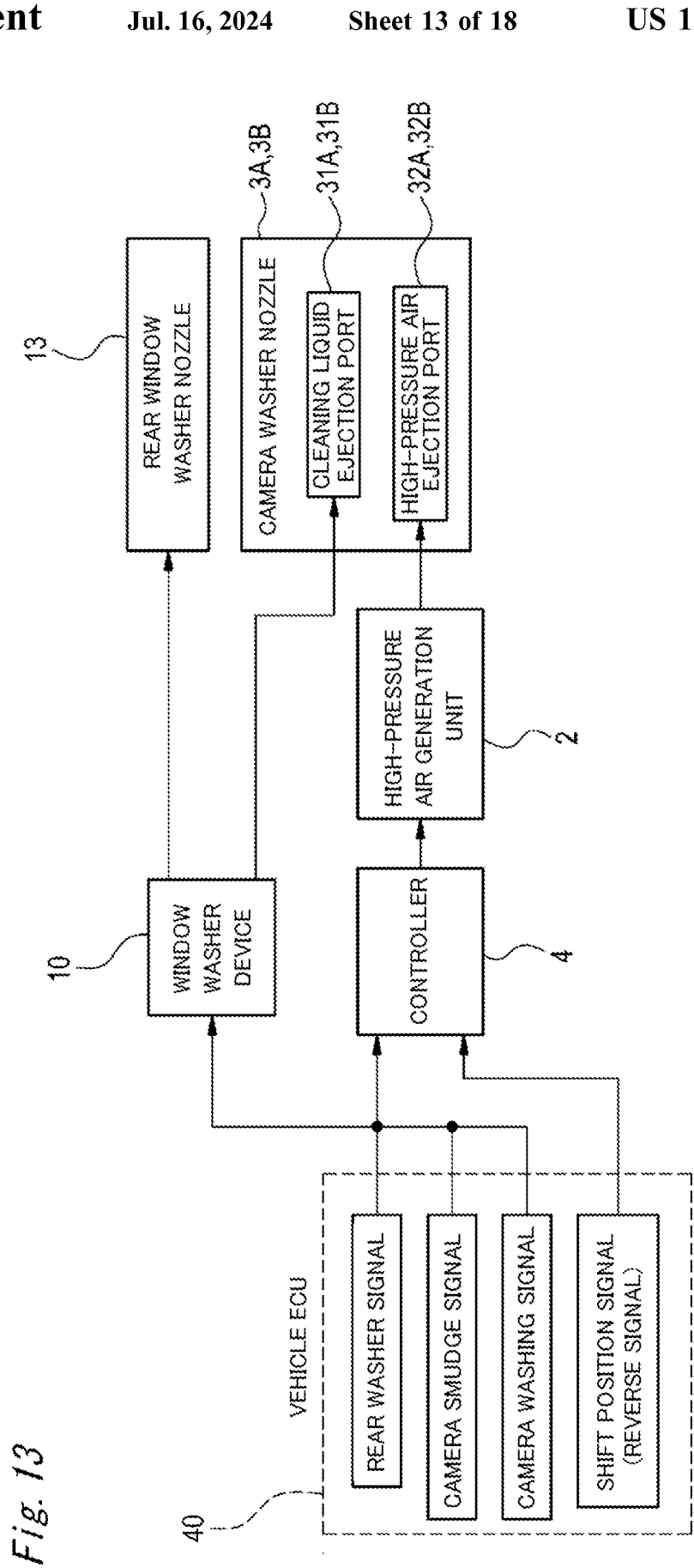
FIG. 13 is a block diagram for illustrating operations of the vehicular cleaner system.
Figure 14:
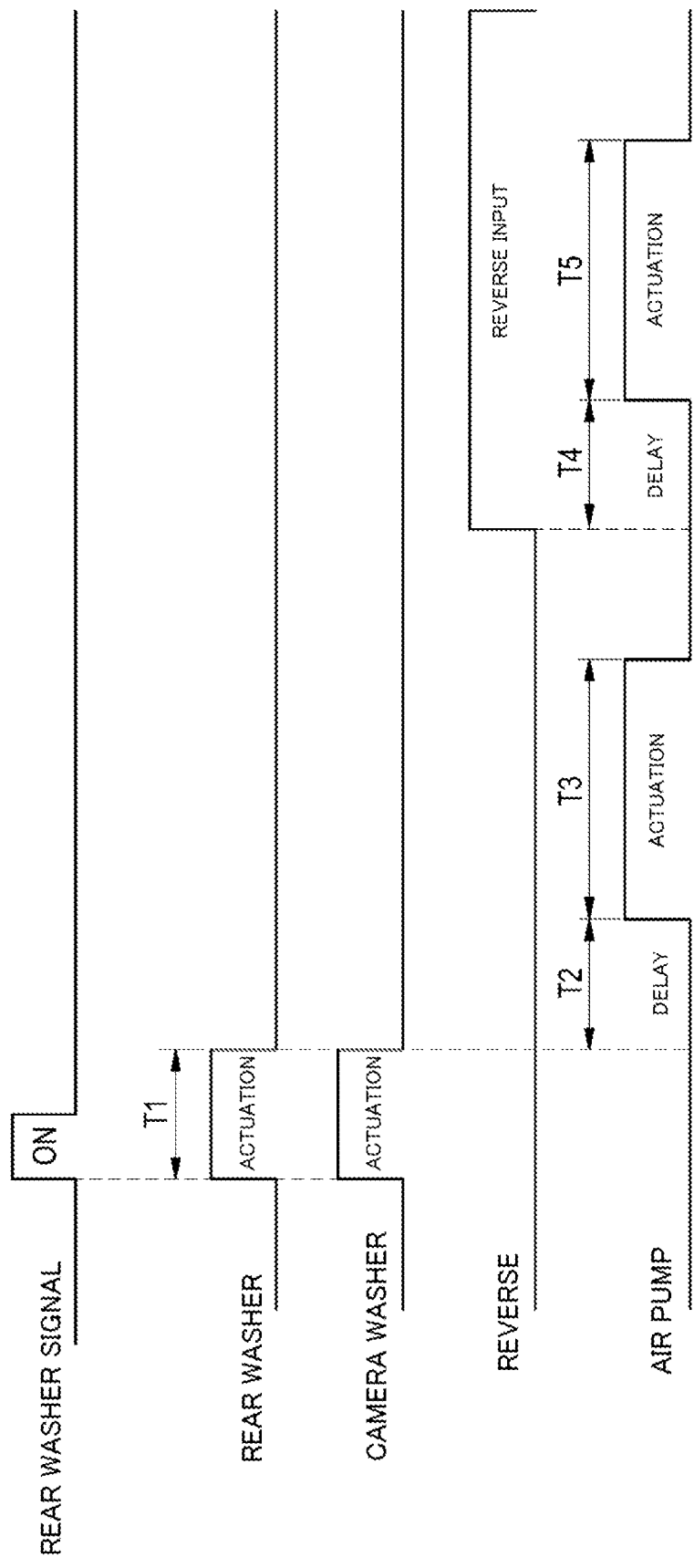
FIG. 14 is a timing chart for illustrating operations of the vehicular cleaner system.

As shown in FIGS. 13 and 14, for example, when the rear washer button for cleaning the rear window 200 of the vehicle V is pushed, a rear washer signal is transmitted from the vehicle ECU 40 to the motor pump 12 of the window washer device 10 and the controller 4.

The motor pump 12 having received the rear washer signal pressure-feeds the cleaning liquid in the tank 11 to the nozzle 13 of the window washer device 10, the nozzle 3A of the inner minor camera 100A and the nozzle 3B of the rearview camera 100B through the coupling hose 15. The cleaning liquid pressure-fed to the nozzle 13 is sent from the coupling hose 15 to the ejection port 14 of the nozzle 13 and is sprayed toward the rear window 200. The cleaning liquid pressure-fed to the nozzle 3A passes through the tube path 34A from the coupling hose 15, is sent to the cleaning liquid ejection port 31A, and is then sprayed toward the lens 101A of the inner minor camera 100A. The cleaning liquid pressure-fed to the nozzle 3B passes through the tube path 34B from the coupling hose 15, is sent to the cleaning liquid ejection port 31B and is then sprayed toward the lens 101B of the rearview camera 100B.

Time T1 for which the rear window 200 is to be washed on the basis of one rear washer signal can be arbitrarily set. Also, the washing of the inner minor camera 100A and the rearview camera 100B based on one rear washer signal is implemented in synchronization with a cleaning operation of cleaning the rear window 200. Therefore, the time for which the inner mirror camera 100A and the rearview camera 100B are to be washed becomes the same length as time T1 for which the rear window 200 is to be washed (or control may be performed so that the time is to be different from time T1).

The controller 4 having received the rear washer signal transmits a high-pressure air generation signal for operating the high-pressure air generation unit 2 toward the control unit 23 after predetermined time T2 has elapsed from completion of the cleaning of the rear window 200, based on time T1 for which the rear window 200 is washed. The control unit 23 operates the generation main body part 22 of the high-pressure air generation unit 2 to generate the high-pressure air, and delivers the generated high-pressure air toward the nozzle 3A of the inner minor camera 100A and the nozzle 3B of the rearview camera 100B.

The high-pressure air delivered to the nozzle 3A passes through the coupling hose 29A and the tube path 35A from the ejection port 51A of the cylinder 50A, is sent to the high-pressure air ejection port 32A, and is then sprayed toward the lens 101A of the inner mirror camera 100A. The high-pressure air delivered to the nozzle 3B passes through the coupling hose 29B and the tube path 35B from the ejection port 51B of the cylinder 50B, is sent to the high-pressure air ejection port 32B and is then sprayed toward the lens 101B of the rearview camera 100B. The spraying of the high-pressure air is implemented with delay time T2 from completion of the cleaning of the rear window 200 by the cleaning liquid. Time T3 for which the cleaning is to be performed by the high-pressure air can be arbitrarily set.

Also, as shown in FIGS. 13 and 14, when the gear of the vehicle V is shifted to the reverse position, for example, a reverse signal is transmitted from the vehicle ECU 40 to the controller 4.

The controller 4 having received the reverse signal transmits a high-pressure air generation signal for operating the high-pressure air generation unit 2 toward the control unit 23, after predetermined time T4 has elapsed from the shift of the gear. The control unit 23 operates the generation main body part 22 of the high-pressure air generation unit 2 to generate a high-pressure air, and delivers the generated high-pressure air to the nozzle 3A of the inner minor camera 100A and the nozzle 3B of the rearview camera 100B.

The high-pressure air delivered to the nozzle 3A and the nozzle 3B is sprayed from the high-pressure air ejection port 32A and the high-pressure air ejection port 32B toward the respective camera lenses, like the case where the rear washer button is pushed. Time T5 for which the cleaning is to be performed by the high-pressure air can be arbitrarily set. Like this, the spraying of the cleaning liquid may be sprayed toward the inner mirror camera 100A and the rearview camera 100B, depending on the change in shift position of the gear, without synchronizing with the spraying toward the rear window 200. In the meantime, when the gear is shifted to the reverse position, the controller 4 may spray the high-pressure air only from the nozzle 3B of the rearview camera 100B without spraying the high-pressure air from the nozzle 3A of the inner mirror camera 100A.

Figure 15:
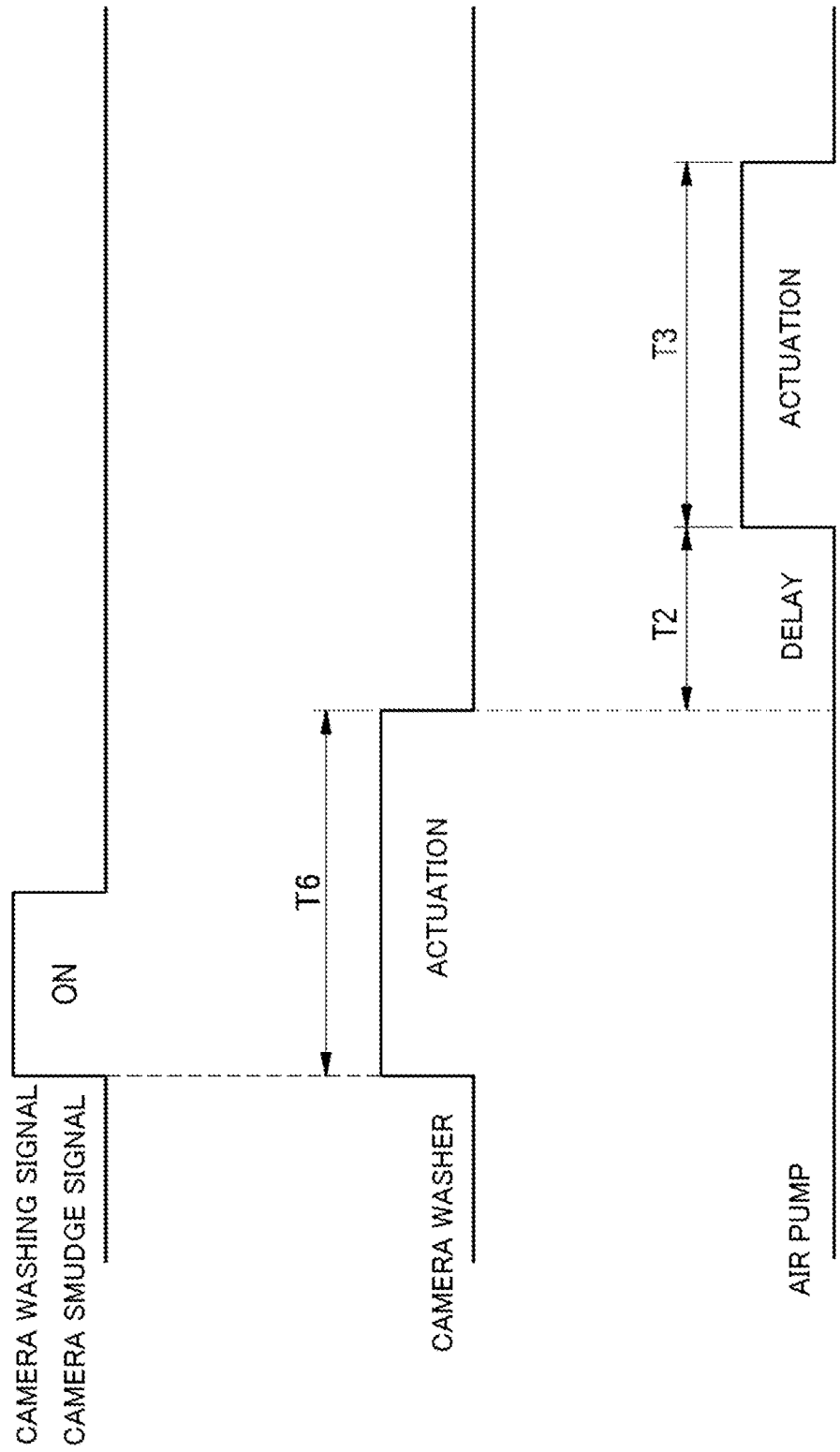
FIG. 15 is a timing chart for illustrating operations of the vehicular cleaner system.

Also, as shown in FIGS. 13 and 15, for example, when it is recognized that the lens 101A of the inner minor camera 100A or the lens 101B of the rearview camera 100B is smudged, a camera smudge signal is transmitted from the vehicle ECU 40 to the motor pump 12 of the window washer device 10 and the controller 4. Whether the lens is smudged is recognized on the basis of the image data captured by each camera, for example.

The motor pump 12 having received the camera smudge signal pressure-feeds the cleaning liquid in the tank 11 to the nozzle 3A of the inner mirror camera 100A and the nozzle 3B of the rearview camera 100B through the coupling hose 15. The pressure-fed cleaning liquid is sprayed from the cleaning liquid ejection port 31A of the nozzle 3A toward the lens 101A of the inner minor camera 100A and from the cleaning liquid ejection port 31B of the nozzle 3B toward the lens 101B of the rearview camera 100B. In the meantime, when the camera smudge signal is transmitted, the cleaning of the rear window 200 is not implemented. In this case, for example, a flow path switching unit for switching a flow path of the cleaning liquid is provided on the way of the coupling hose 15, and when the camera smudge signal is transmitted, the flow path switching unit is controlled to enable the cleaning liquid to flow toward only the nozzles 3A, 3B, thereby cleaning only the lenses 101A, 101B of the cameras 100A, 100B. Time T6 for which the lenses 101A, 101B are to be cleaned on the basis of one camera smudge signal can be arbitrarily set.

The controller 4 having received the camera smudge signal transmit a high-pressure air generation signal for operating the high-pressure air generation unit 2 toward the control unit 23, after predetermined time T2 has elapsed from completion of the cleaning of the lenses 101A, 101B, based on time T6 for which the lenses 101A, 101B are cleaned. The operations to be performed thereafter are the same as the case where the rear washer button is pushed and the rear washer signal is received, and the high-pressure air is sprayed from the high-pressure air ejection port 32A and the high-pressure air ejection port 32B toward the lens 101A of the inner mirror camera 100A and the lens 101B of the rearview camera 100B. The spraying of the high-pressure air is implemented with delay time T2 from completion of the spraying of the lenses 101A, 101B by the spraying of the cleaning liquid.

Also, as shown in FIGS. 13 and 15, for example, a camera washing button (an actuation switch) for cleaning the vehicle-mounted camera may be provided in the vehicle interior, the vehicle ECU 40 may determine whether the camera washing button is pushed, and the spraying of the cleaning liquid toward the inner mirror camera 100A and the rearview camera 100B may be controlled. Specifically, when the camera washing button is pushed, a camera washing signal is transmitted from the vehicle ECU 40 to the motor pump 12 of the window washer device 10 and the controller 4.

The operations of the motor pump 12 and the controller 4 having received the camera washing signal are the same as the operations of the motor pump 12 and the controller 4, which are performed when the lens of the camera is recognized as being smudged and the camera smudge signal is received.

In the meantime, in the respective operations, when cleaning the inner mirror camera 100A and the rearview camera 100B, the two-type cleaning by the spraying of the cleaning liquid and the spraying of the high-pressure air is performed for both the cameras. However, the present invention is not limited thereto. For example, the two-type cleaning by the spraying of the cleaning liquid and the spraying of the high-pressure air may be performed for the inner mirror camera 100A, and the cleaning only by the spraying of the high-pressure air may be performed for the rearview camera 100B, and vice versa.

The vehicular cleaner system 1 configured as described above has the actuation mode in which the cleaning liquid and the high-pressure air are to be sprayed toward the vehicle-mounted camera 100 and the actuation mode in which only the high-pressure air is to be sprayed toward the vehicle-mounted camera 100, and can switch the modes by the controller. Therefore, it is possible to effectively remove the foreign matters attached to the vehicle-mounted camera 100 with the simple configuration.

Also, it is possible to switch the actuation mode in which the cleaning liquid and the high-pressure air are to be sprayed and the actuation mode in which only the high-pressure air is to be sprayed, depending on the type of the to-be-cleaned object. Therefore, it is possible to clean a variety of the to-be-cleaned objects by the appropriate method. In this case, for example, the cleaning liquid and the high-pressure air can be sprayed toward the inner mirror camera 100A, which is to be operated while at least the engine is on, and the high-pressure air can be sprayed toward the rearview camera 100B, which is to be operated when the gear is switched to the reverse position. Therefore, while securing the high cleaning ability for the inner minor camera 100A that is to be frequently used, it is possible to suppress the consumption of the motor pump 12 and the cleaning liquid.

Also, for example, when cleaning the inner mirror camera 100A, the spraying of the high-pressure air from the high-pressure air ejection port 32A can be initiated after the spraying of the cleaning liquid from the cleaning liquid ejection port 31A of the nozzle 3A has been initiated. Therefore, it is possible to effectively remove the foreign matters attached to the inner mirror camera 100A with the simple configuration.

Also, the actuation mode in which the cleaning liquid is to be sprayed from both the cleaning liquid ejection port 31A of the nozzle 3A and the ejection port 14 of the nozzle 13 and the actuation mode in which the cleaning liquid is to be sprayed from only one of the cleaning liquid ejection port 31A and the ejection port 14 are provided, and the modes can be switched by the controller. Therefore, the modes are switched depending on the situations, so that it is possible to suppress lowering in lifetime of the motor pump 12 and consumption of the cleaning liquid.

Also, for example, an actuation switch (camera washing button) that can be set by a driver may be provided in the vehicle interior, and when the actuation switch is on, the cleaning liquid may be sprayed toward the vehicle-mounted camera 100. Therefore, it is possible to execute the spraying of the cleaning liquid and the high-pressure air toward the vehicle-mounted camera 100, depending on whether the driver turns on or off the actuation switch.

Also, for example, the spraying of the high-pressure air from the high-pressure air ejection port 32A is initiated after time T2 has elapsed from completion of the spraying of the cleaning liquid from the cleaning liquid ejection port 31A of the nozzle 3A for the inner mirror camera 100A. For this reason, it is possible to prevent the cleaning liquid, which is to be sprayed from the cleaning liquid ejection port 31A, from being introduced to the high-pressure air ejection port 32A for the high-pressure air.

Also, the tank and the motor pump, which are used so as to spray the cleaning liquid toward the vehicle-mounted camera 100, are used as the tank 11 and the motor pump 12 of the window washer device 10 for spraying the cleaning liquid toward the window of the vehicle, too. Therefore, the cleaning liquid that is to be used for the window washer device 10 can be used as the cleaning liquid for cleaning the vehicle-mounted sensor 100 and the like, too, so that it is possible to remove the foreign matters with the convenience configuration.

Also, for example, the nozzle 3A mounted to the inner mirror camera 100A has the cleaning liquid ejection port 31A configured to spray the cleaning liquid and the high-pressure air ejection port 32A configured to spray the high-pressure air, which are independently provided. For this reason, the high-pressure air and the cleaning liquid are independently sprayed to the same to-be-cleaned object (the inner mirror camera 100A), so that it is possible to effectively remove the foreign matters attached to the to-be-cleaned object.

Also, the cleaning liquid ejection port 31A of the nozzle 3A is formed at the position more distant from the lens 101A than the high-pressure air ejection port 32A. For this reason, when cleaning the lens 101A by using the cleaning liquid and the high-pressure air, it is possible to prevent the cleaning liquid of the cleaning liquid ejection port 31A from being introduced upon the spraying of the high-pressure air from the high-pressure air ejection port 32A. Also, the ejection angle θ1 of the ejection path 38A in the cleaning liquid ejection port 31A is formed greater than the ejection angle θ2 of the ejection path 39A in the high-pressure air ejection port 32A. For this reason, it is possible to widen a spraying area of the cleaning liquid from the cleaning liquid ejection port 31A arranged more distant from the lens 101A than the high-pressure air ejection port 32A.

Also, the cleaning liquid ejection port 31A and the high-pressure air ejection port 32A of the nozzle 3A are aligned in parallel on the upper surface of the inner mirror camera 100A, for example. For this reason, it is possible to downsize the nozzle 3A. Also, the high-pressure air ejection port 32A is arranged at the position facing the central part of the lens 101A on the upper surface of the inner minor camera 100A. For this reason, the high-pressure air, which is more susceptible to surrounding environments (for example, weather conditions such as wind) than the cleaning liquid, can be appropriately sprayed toward the lens 101A. Also, the step 33 stepped in the upper and lower direction is formed between the cleaning liquid ejection port 31A and the high-pressure air ejection port 32A. For this reason, it is possible to prevent the cleaning liquid, which is to be sprayed from the cleaning liquid ejection port 31A, from being introduced into the high-pressure air ejection port 32A for the high-pressure air.

Also, the cleaning liquid ejection port 31A can be arranged so as to spray the cleaning liquid from a direction different from the spraying direction of the high-pressure air from the high-pressure air ejection port 32A. In this case, it is possible to prevent the spraying of the high-pressure air and the spraying of the cleaning liquid from interfering with each other. For example, the high-pressure air ejection port 32A may be arranged at a position at which the high-pressure air is to be sprayed toward the lens 101A from one direction in the upper and lower direction, and the cleaning liquid ejection port 31A may be arranged at a position at which the cleaning liquid is to be sprayed toward the lens 101A from one direction in the right and left direction. In this case, the high-pressure air, which is more susceptible to the exterior air environment than the cleaning liquid, can be appropriately sprayed toward the cleaning surface.

Also, the high-pressure air generation unit 2 for generating the high-pressure air is provided with the two pistons 60A, 60B configured to be movable by the movement mechanism 70 and the cylinders 50A, 50B corresponding to the respective pistons, for the single drive unit 80. For this reason, it is possible to effectively remove the foreign matters attached to the plurality of vehicle-mounted cameras 100 with the simple configuration.

Also, the movement mechanism 70 includes the single worm 71 configured to rotate by the single drive unit 80 and the two worm wheels 72A, 72B configured to rotate with being meshed with the worm 71. For this reason, it is possible to form the high-pressure air generation unit 2 having a plurality of cylinders with the simple configuration.

Also, the cylinder 50A and the cylinder 50B are arranged at symmetrical positions about the drive shaft 81 of the drive unit 80. For this reason, it is possible to thin the high-pressure air generation unit 2 and to cancel vibrations to be generated from the respective cylinders 50A, 50B upon the spraying of the high-pressure air. Also, since the drive unit 80 is interposed between the cylinder 50A and the cylinder 50B, it is possible to further miniaturize the high-pressure air generation unit 2. Also, since the ejection port 51A of the cylinder 50A is formed to face toward the opposite direction to the ejection port 51B of the cylinder, it is possible to further cancel the vibrations upon the spraying of the high-pressure air.

Also, the phase of the piston 60A of the cylinder 50A and the phase of the piston 60B of the cylinder 50B may be configured to be different from each other. In this case, it is possible to spray the high-pressure air toward the plurality of vehicle-mounted cameras 100 at different timings.

Also, the cylinders 50A, 50B and the housing 90 of the generation main body part 22 have engaging parts to be engaged with each other. For this reason, the cylinders 50A, 50B can be easily mounted to the housing 90 of the generation main body part 22.

Modified Embodiments

Figure 16:
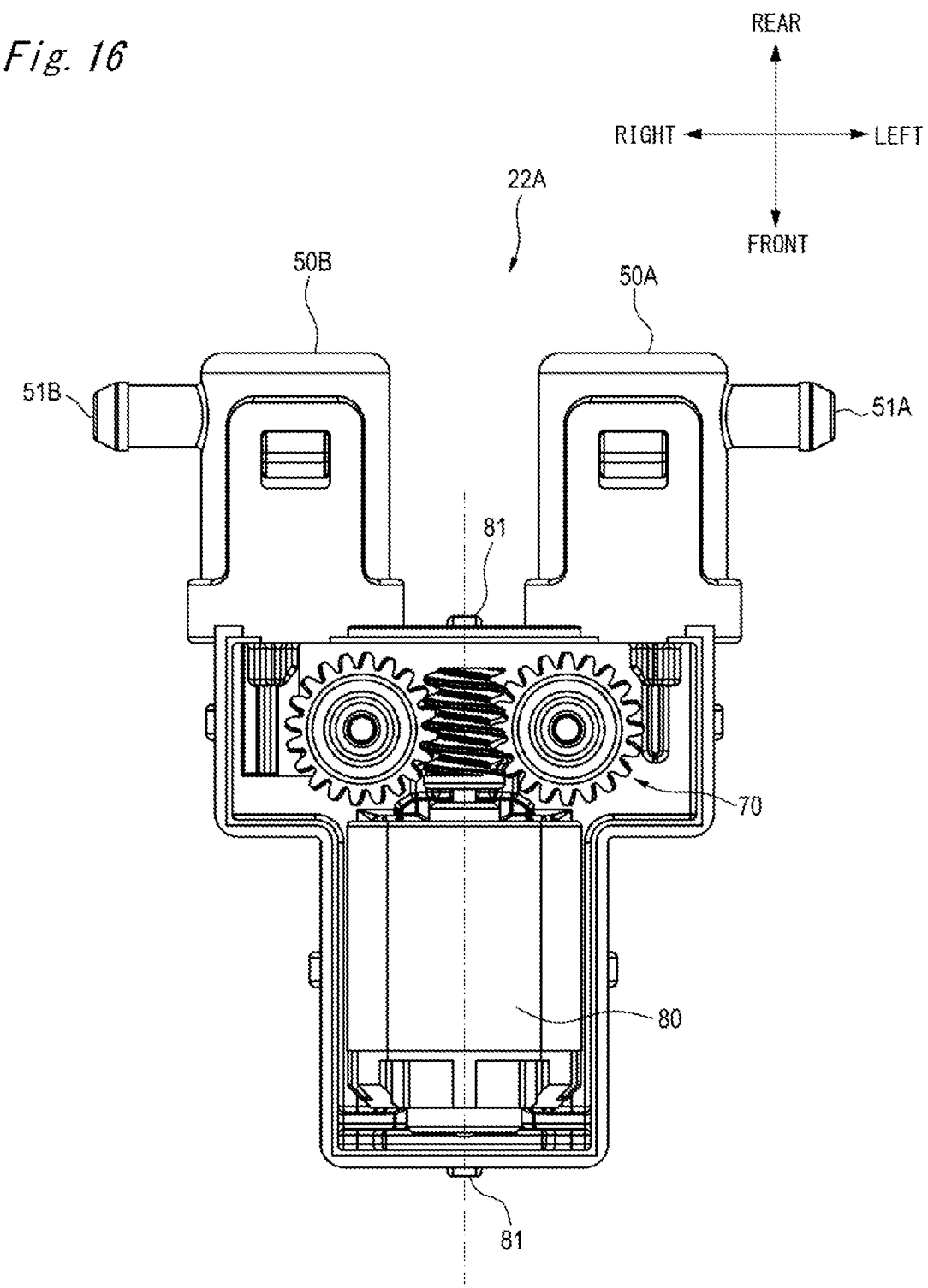
FIG. 16 is a plan view depicting a first modified embodiment of the generation main body part.

In the below, a first modified embodiment of the generation main body part 22 of the high-pressure air generation unit 2 is described with reference to FIG. 16. In the meantime, since the parts denoted with the same reference numerals as the above embodiment have the same functions, the overlapping descriptions thereof are omitted.

In the generation main body part 22 (refer to FIG. 8) of the above embodiment, the drive unit 80 is interposed between the cylinder 50A and the cylinder 50B. In contrast, as shown in FIG. 16, in a generation main body part 22A of the first modified embodiment, the drive unit 80 is arranged in front of the cylinder 50A and the cylinder 50B. In the meantime, the configuration where the cylinder 50A and the cylinder 50B are arranged at the bilaterally symmetrical positions about the drive shaft 81 of the drive unit 80 is the same as the generation main body part 22.

According to the above configuration, since the cylinder 50A and the cylinder 50B are arranged at the symmetrical positions, it is possible to cancel the vibrations that are to be generated upon the operations of the cylinders.

In the below, a second modified embodiment of the generation main body part 22 of the high-pressure air generation unit 2 is described with reference to FIGS. 17A and 17B. In the meantime, the overlapping descriptions of the parts denoted with the same reference numerals as the above embodiment are omitted, like the first modified embodiment.

In the generation main body part 22 (refer to FIG. 8) of the above embodiment, the movement mechanism 70 includes the single worm 71 and the two worm wheels 72A, 72B. In contrast, in a generation main body part 22B of the second modified embodiment, a movement mechanism 70a includes the single worm 71 and a single worm wheel 72. The worm wheel 72 is configured by a driven gear 73 and pinions 74A, 74B aligned in parallel and protruding toward one side (for example, the upper side shown in FIG. 17B) of the driven gear 73. Gear teeth 75a, 75b of the pinions 74A, 74B are configured to mesh with the rack teeth 63A, 63B of the racks 62A, 62B. In the meantime, the two pinions 74A, 74B may be arranged to protrude laterally (for example, both sides in the upper and lower direction, in FIG. 17B) from a central part of the driven gear 73 with the driven gear 73 being interposed therebetween.

Figure 17A:
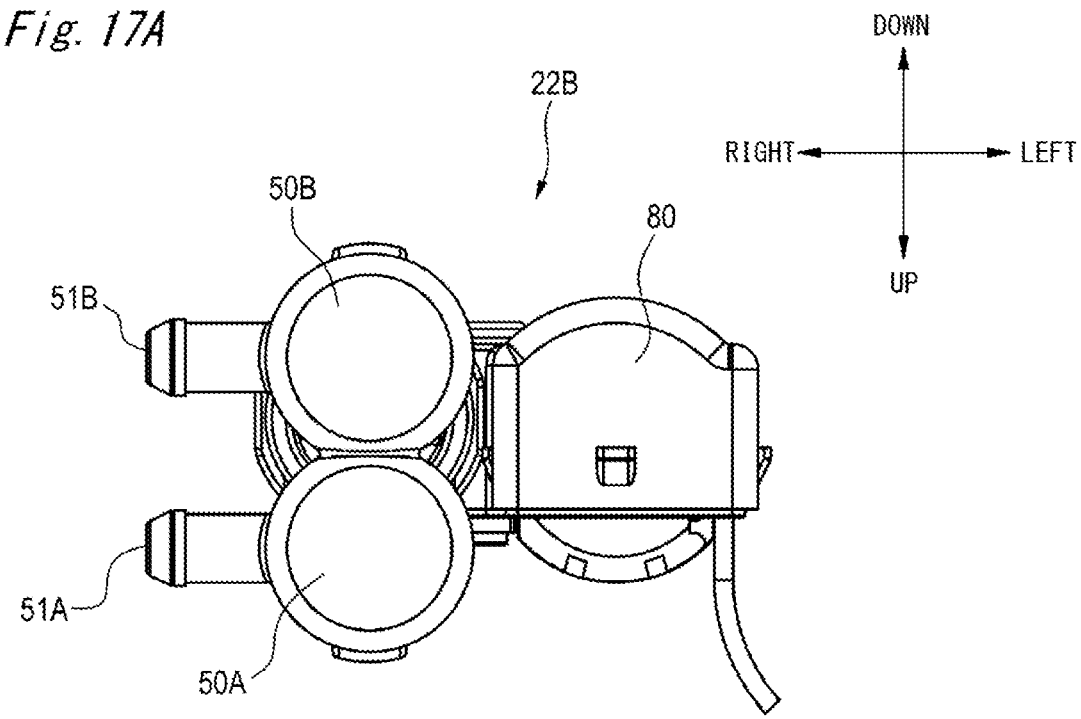
FIG. 17A is a rear view depicting a second modified embodiment of the generation main body part.
Figure 17B:
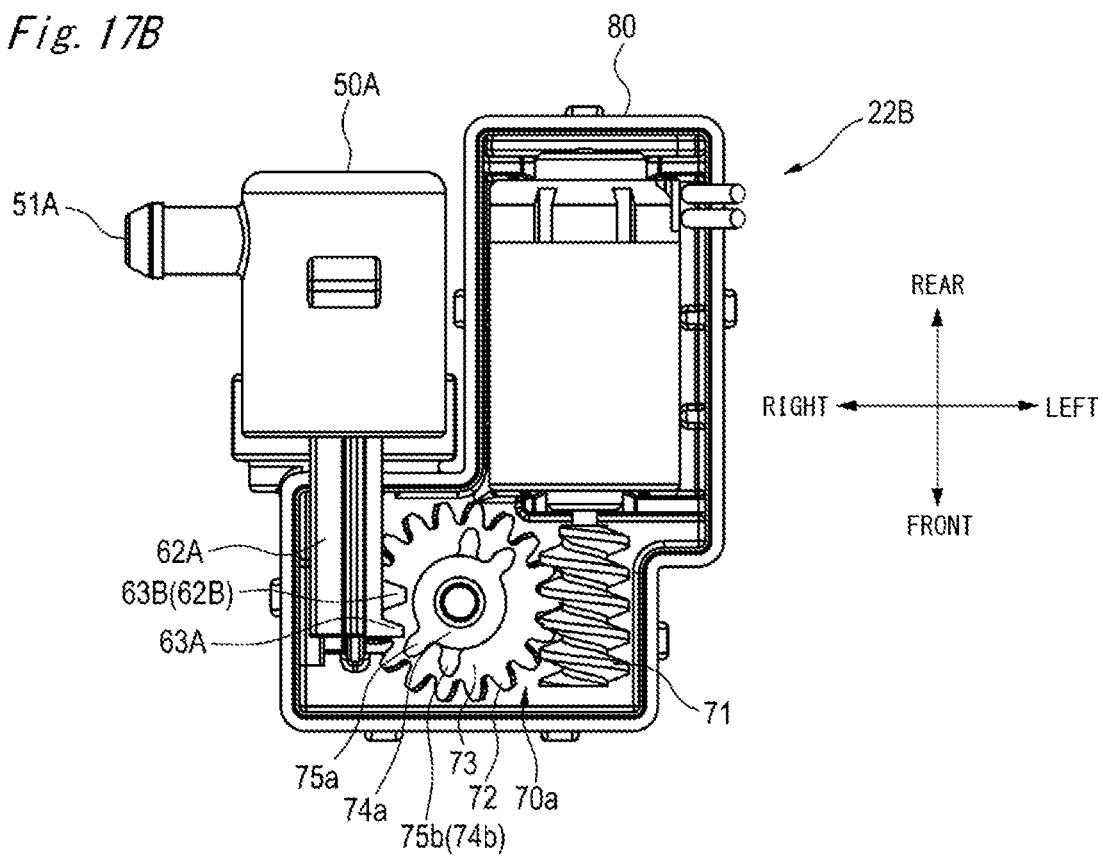
FIG. 17B is a plan view depicting the second modified embodiment of the generation main body part.

As shown in FIG. 17A, the two cylinders 50A, 50B are aligned in parallel with being adjacent to each other in the upper and lower direction, and the ejection ports 51A, 51B of the respective cylinders are provided to face toward the same direction (in this example, rightward). The single drive unit 80 is arranged at the left of the cylinders 50A, 50B.

According to the above configuration, since it is possible to reduce a width of the generation main body part 22B in the right and left direction, it is possible to miniaturize the high-pressure air generation unit 2.

Figure 18:
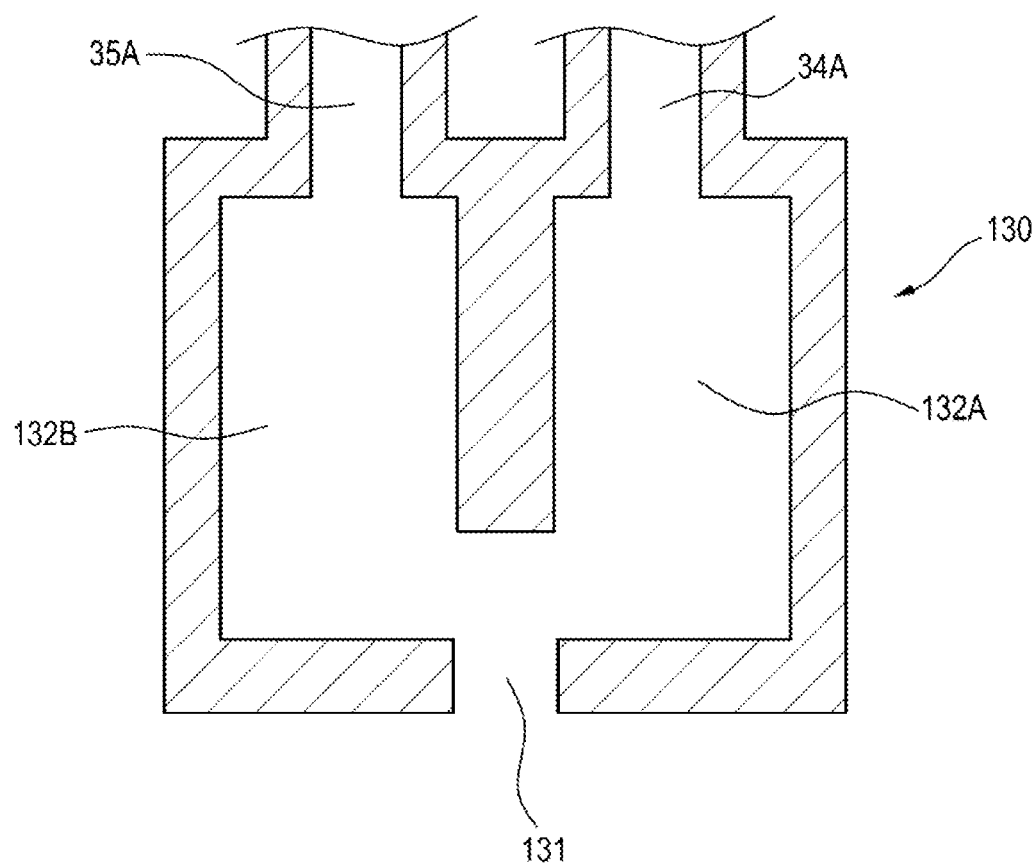
FIG. 18 is a sectional view depicting a modified embodiment of the nozzle.

In the below, a modified embodiment of the nozzle 3A, 3B that are to be mounted to the vehicle-mounted camera 100 is described with reference to FIG. 18. In the meantime, since the parts denoted with the same reference numerals as the above embodiment have the same functions, the overlapping descriptions thereof are omitted.

The nozzle 3A (refer to FIGS. 10 to 12) of the above embodiment is formed with the cleaning liquid ejection port 31A configured to spray the cleaning liquid and the high-pressure air ejection port 32A configured to spray the high-pressure air, as independent separate ejection ports. In contrast, as shown in FIG. 18, a nozzle 130 of the modified embodiment is formed with one common ejection port 131, as the ejection port configured to spray the cleaning liquid and the ejection port configured to spray the high-pressure air. In the nozzle 130, a passage 132A of the cleaning liquid and a passage 132B of the high-pressure air are separately formed in parallel, and the ejection port 131 is formed at a center of end portions of both the passages.

According to the above configuration, the ejection port of the nozzle is configured by one ejection port, so that it is possible to miniaturize the nozzle 130. Also, since it is possible to simplify the structure of the nozzle 130, it is possible to easily manufacture the same.

In the meantime, the present invention is not limited to the above embodiments, and can be appropriately modified and improved. In addition, the materials, shapes, sizes, numerical values, forms, numbers, arrangement places and the like of the constitutional elements of the above embodiments are arbitrary and are not particularly limited inasmuch as the present invention can be implemented.

The subject application is based on Japanese Patent Application Nos. 2016-256292 filed on Dec. 28, 2016, 2016-256293 filed on Dec. 28, 2016-256294 filed on December 28 and 2016-256295 filed on December 28, the contents of which are incorporated herein by reference.

The invention claimed is:

1. A vehicular cleaner system for cleaning a to-be-cleaned object of a vehicle, comprising:
    a tank configured to accommodate therein a cleaning liquid;
    a pump configured to pressure-feed the cleaning liquid in the tank;
    a high-pressure air generation unit configured to generate a high-pressure air;
    a first ejection port configured to spray the cleaning liquid toward a cleaning surface of the to-be-cleaned object;
    a second ejection port configured to spray the high-pressure air toward the cleaning surface;
    a window washer for spraying the cleaning liquid toward a window of the vehicle; and
    a controller configured to control the spraying of the cleaning liquid and the spraying of the high-pressure air,
    wherein the to-be-cleaned object comprises a vehicle-mounted sensor to be mounted on the vehicle;
    wherein the controller is configured to initiate the spraying of the high-pressure air from the second ejection port after the spraying of the cleaning liquid from the first ejection port has been initiated,
    wherein the window washer has a third ejection port configured to spray the cleaning liquid toward the window, and
    wherein the controller is configured to switchably execute a first mode in which the cleaning liquid is to be sprayed from both the first ejection port and the third ejection port, a second mode in which the cleaning liquid is to be sprayed from any one of the first ejection port and the third ejection port, and a third mode in which the high-pressure air is to be sprayed from the second ejection port without spraying the cleaning liquid from the first ejection port.

2. The vehicular cleaner system according to claim 1, wherein the controller is configured to initiate the spraying of the high-pressure air from the second ejection port after predetermined time elapses from completion of the spraying of the cleaning liquid from the first ejection port.

3. The vehicular cleaner system according to one of claim 1, wherein the first ejection port and the second ejection port are configured as one ejection port.

4. The vehicular cleaner system according to one of claim 1, wherein the first ejection port and the second ejection port are configured as independent separate ejection ports, and
    wherein the first ejection port is formed at a position more distant from the cleaning surface than the second ejection port.

5. A vehicle comprising the vehicular cleaner system according to claim 1.

* * * * *